United States Patent
Mildh et al.

(10) Patent No.: US 11,051,355 B2
(45) Date of Patent: Jun. 29, 2021

(54) CORRELATION OF USER EQUIPMENT IDENTITY TO INFORMATION CENTRIC NETWORKING REQUEST

(71) Applicant: Telefonaktiebolaget LM Ericsson (publ), Stockholm (SE)

(72) Inventors: Gunnar Mildh, Sollentuna (SE); Hans Eriksson, Sollentuna (SE); Kim Laraqui, Solna (SE); Neiva Lindqvist, Vällingby (SE); Ala Nazari, Handen (SE); Börje Ohlman, Bromma (SE); Ioanna Pappa, Stockholm (SE); Dinand Roeland, Sollentuna (SE); Johan Rune, Lidingö (SE); Patrik Sellstedt, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 437 days.

(21) Appl. No.: 15/108,432

(22) PCT Filed: May 13, 2016

(86) PCT No.: PCT/EP2016/060882
§ 371 (c)(1),
(2) Date: Jun. 27, 2016

(87) PCT Pub. No.: WO2017/148541
PCT Pub. Date: Sep. 8, 2017

(65) Prior Publication Data
US 2017/0257904 A1     Sep. 7, 2017

Related U.S. Application Data

(60) Provisional application No. 62/301,874, filed on Mar. 1, 2016, provisional application No. 62/301,816, filed on Mar. 1, 2016.

(51) Int. Cl.
*H04W 76/20* (2018.01)
*H04W 68/00* (2009.01)
(Continued)

(52) U.S. Cl.
CPC ............ *H04W 76/20* (2018.02); *H04W 8/22* (2013.01); *H04W 68/005* (2013.01); *H04W 76/30* (2018.02)

(58) Field of Classification Search
CPC ... H04W 68/005; H04W 76/20; H04W 76/30; H04W 76/04; H04W 8/22; H04W 76/06; H04W 72/005
See application file for complete search history.

(56) References Cited

U.S. PATENT DOCUMENTS

| 6,243,580 B1 | 6/2001 | Garner |
| 6,542,739 B1 | 4/2003 | Garner |

(Continued)

FOREIGN PATENT DOCUMENTS

| CN | 103686807 A | 3/2014 |
| CN | 104823479 A | 8/2015 |

(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0, Dec. 2015, 1-290.

(Continued)

*Primary Examiner* — Saumit Shah
(74) *Attorney, Agent, or Firm* — Murphy, Bilak & Homiller, PLLC

(57) ABSTRACT

An access node (620) of the cellular network determines a correlation of an identifier of a user equipment (610) with an
(Continued)

entry of a Pending Interest Table maintained by an Information Centric Networking node (670). The Pending Interest Table comprises an entry for each data object having a pending Information Centric Networking request (801) at the Information Centric Networking node (670). Based on the correlation, the access node (620) controls a connection of the user equipment (610) with the cellular network. This may involve deciding whether to release the user equipment (610) to idle mode or paging of the user equipment (610).

14 Claims, 16 Drawing Sheets

(51) Int. Cl.
*H04W 8/22* (2009.01)
*H04W 76/30* (2018.01)

(56) References Cited

U.S. PATENT DOCUMENTS

| | | | |
|---|---|---|---|
| 9,191,459 B2 | 11/2015 | Ravindran et al. | |
| 9,560,502 B2 | 1/2017 | Helferich | |
| 2013/0016695 A1 | 1/2013 | Ravindran et al. | |
| 2014/0003348 A1* | 1/2014 | Velev | H04W 60/06 370/328 |
| 2014/0006565 A1* | 1/2014 | Muscariello | H04L 67/2833 709/219 |
| 2014/0237085 A1* | 8/2014 | Park | G06Q 50/10 709/219 |
| 2014/0269275 A1* | 9/2014 | Jun | H04W 36/22 370/230 |
| 2014/0314093 A1* | 10/2014 | You | H04L 45/306 370/392 |
| 2015/0141062 A1* | 5/2015 | Ostrup | H04W 68/04 455/458 |
| 2015/0222479 A1 | 8/2015 | Kim et al. | |
| 2015/0281083 A1* | 10/2015 | Kim | H04L 45/7457 370/235 |
| 2015/0296499 A1* | 10/2015 | Huang | H04W 72/048 370/329 |
| 2015/0319204 A1* | 11/2015 | You | H04L 45/00 709/231 |
| 2016/0072715 A1* | 3/2016 | Mahadevan | H04L 47/286 370/236 |
| 2016/0156737 A1* | 6/2016 | Perino | H04L 67/2842 709/238 |
| 2016/0242191 A1* | 8/2016 | Liao | H04W 76/38 |
| 2016/0255535 A1* | 9/2016 | De Foy | H04L 67/2804 370/236 |
| 2016/0262159 A1* | 9/2016 | Puddle | H04W 4/70 |
| 2017/0093691 A1 | 3/2017 | Garcia-Luna-Aceves | |

FOREIGN PATENT DOCUMENTS

| | | |
|---|---|---|
| CN | 105340323 A | 2/2016 |
| WO | 2013183967 A1 | 12/2013 |
| WO | 2014139481 A1 | 9/2014 |
| WO | 2015077992 A1 | 6/2015 |
| WO | 2015176239 A1 | 11/2015 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.5.0, Dec. 2015, 1-337.

Mosko, M. et al., "CCNx Messages in TLV Format", ICNRG Internet Draft, PARC, Inc., Jan. 11, 2016, 1-36.

Mosko, M. et al., "CCNx Semantics", ICNRG, Internet Draft, PARC, Inc., Apr. 4, 2016, 1-26.

Mosko, M., "CCNx Semantics", Internet Engineering Task Force, PARC, Inc., Jul. 21, 2014, 1-9.

Unknown, Author, "CCNx Conference 2013", PARC, Palo Alto, California, Sep. 5-6, 2013, 1-84.

Kim, Do-Hyung, "Mobility Support in Content Centric Networks", Information-Centric Networking, ACM 2012 Helsinki, Finland, Aug. 17, 2012, 13-17.

Lee, Jihoon et al., "Proxy-based Mobility Management Scheme in Mobile Content Centric Networking (CCN) environments", 2011 IEEE International Conference on Consumer Electronics (ICCE), 2011, 595-596.

Liu, Lei et al., "CAMS: Coordinator Assisted Mobility Support for seamless and Bandwidth-Efficient Handover in ICN", 2015 IEEE Globecom Workshops, Dec. 6, 2015, 1-7.

Satria, Triadimas A. et al., "Performance evaluation of ICN/CCN based service migration approach in virtualized LTE systems", 2014 IEEE 3rd International Conference on Cloud Networking (CloudNet), Oct. 8, 2014, 461-467.

Wang, Xiaofei et al., "Cache in the Air: Exploiting Content Caching and Delivery Techniques for 5G Systems", 5G Wireless Communication Systems: Prospects and Challenges IEEE Communications Magazine, Feb. 2014, 131-139.

\* cited by examiner

CORRELATION OF USER EQUIPMENT IDENTITY TO INFORMATION CENTRIC NETWORKING REQUEST

TECHNICAL FIELD

The present invention relates to methods for conveying data in a cellular network and to corresponding devices and systems.

BACKGROUND

In networking, paradigms referred to as Information Centric Networking (ICN), Content Centric Networking (CCN), and Named Data Networking (NDN) have been developed. CCN and NDN may be regarded as specific approaches within the more general ICN paradigm. By way of example, CCN is being developed within IETF (Internet Engineering Task Force) by the ICNRG (ICN Research Group), and details on this work can be found in CCN as defined in ICNRG Internet-Drafts "CCNx Semantics", Version 01, January, 2016, and "CCNx Messages in TLV Format", Version 01, January 2016.

Instead of focusing on connecting communicating endpoints (as traditional networking protocols, such as IP (Internet Protocol), ICN focuses on a content object to be retrieved. In ICN, networking messages are routed based on globally unique names of content objects, rather than on endpoint addresses referring to physical boxes.

In this way, ICN may benefit from in distributing the same information to multiple places in the network. Since routers may cache content objects besides forwarding them, content objects do not need to traverse the entire network every time someone becomes interested in them—a local cached copy suffices. Another advantage with ICN is the aggregation of interests for a given content object. For example, in the case of a flash crowd event where suddenly thousands of endpoints are requesting the same content the source will only need to be reached by one request for the content, and all other requests may be served from the caches of routers along the path towards the source. Since these benefits is also relevant to cellular networks, it may be desirable to enhance a cellular network with CCN/ICN capabilities.

However, enhancement of a cellular network with ICN/CCN capabilities is not straightforward because in a cellular network an end device, also referred to as UE (user equipment) may move between different access nodes. Further, it is possible that the UE does not maintain a permanent data connection to the cellular network. For example, in the LTE (Long Term Evolution) technology as specified by 3GPP ($3^{rd}$ Generation Partnership Project), a UE may move between different base stations, referred to as eNB (evolved Node B), and may transition between states referred to as "ACTIVE" (or "ECM-CONNECTED"), in which the data connection is maintained, and "IDLE" (or ECM-IDLE), in which the data connection is released. If the UE has issued an ICN request for a content object and moved to another access node and/or entered the IDLE mode, the existing ICN/CCN mechanisms might not be sufficient to deliver the content object to the UE when it becomes available.

Accordingly, there is a need for techniques which allow for efficient utilization of ICN mechanisms in a cellular network.

SUMMARY

According to an embodiment of the invention, a method of conveying data in a cellular network is provided. According to the method, an access node of the cellular network determines a correlation of an identifier of a UE with an entry of a Pending Interest Table (PIT) maintained by an ICN node. The PIT comprises an entry for each data object having a pending ICN request at the ICN node. Based on the correlation, the access node controls a connection of the UE with the cellular network. This may involve deciding whether to release the UE to idle mode or paging of the UE.

According to a further embodiment of the invention, a method of conveying data in a cellular network is provided. According to the method, an ICN node maintains a PIT. The PIT comprises an entry for each data object having a pending ICN request at the ICN node. The ICN node receives, from a UE connected to the cellular network, an ICN request for a data object. The ICN node maintains a correlation of an identifier of the UE with that entry of the PIT which corresponds to the requested data object.

According to a further embodiment of the invention, a method of conveying data in a cellular network is provided. According to the method, a UE sends an ICN request for a data object to an ICN node. Further, the UE receives a paging message from the cellular network. The paging message indicates that paging of the UE is due to the ICN request.

According to a further embodiment of the invention, an access node for a cellular network is provided. The access node is configured to determine a correlation of an identifier of a UE with an entry of a PIT maintained by an ICN node. The PIT comprises an entry for each data object having a pending ICN request at the ICN node. Further, the access node is configured to control a connection of the UE with the cellular network based on the correlation.

According to a further embodiment of the invention, an ICN node is provided. The ICN node is configured to maintain a PIT. The PIT comprises an entry for each data object having a pending ICN request at the ICN node. Further, the ICN node is configured to receive, from a UE connected to the cellular network, an ICN request for a data object. Further, the ICN node is configured to maintain a correlation of an identifier of the UE with that entry of the PIT which corresponds to the requested data object.

According to a further embodiment of the invention, a UE is provided. The UE is configured to send an ICN request for a data object to an ICN node. Further, the UE is configured to receive a paging message from the cellular network. The paging message indicates that paging of the UE is due to the ICN request.

According to a further embodiment of the invention a system is provided. The system comprises at least one access node according to the above embodiment and at least one ICN node according to the above embodiment. Further, the system may comprise at least one UE according to the above embodiment.

According to a further embodiment of the invention, a computer program or computer program product is provided, e.g., in the form of a non-transitory storage medium, which comprises program code to be executed by at least one processor of an access node for a cellular network. Execution of the program code causes the access node to determine a correlation of an identifier of a UE with an entry of a PIT maintained by an ICN node. The PIT comprises an entry for each data object having a pending ICN request at the ICN node. Further, execution of the program code causes the access node to control a connection of the UE with the cellular network based on the correlation.

According to a further embodiment of the invention, a computer program or computer program product is provided, e.g., in the form of a non-transitory storage medium, which comprises program code to be executed by at least one processor of an ICN node. Execution of the program code causes the ICN node to maintain a PIT. The PIT comprises an entry for each data object having a pending ICN request at the ICN node. Further, execution of the program code causes the ICN node to receive, from a UE connected to the cellular network, an ICN request for a data object. Further, execution of the program code causes the ICN node to maintain a correlation of an identifier of the UE with that entry of the PIT which corresponds to the requested data object.

According to a further embodiment of the invention, a computer program or computer program product is provided, e.g., in the form of a non-transitory storage medium, which comprises program code to be executed by at least one processor of a UE. Execution of the program code causes the UE to send an ICN request for a data object to an ICN node.

Further, the UE is configured to receive a paging message from the cellular network. The paging message indicates that paging of the UE is due to the ICN request.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to conveying of data in a cellular network using ICN mechanisms, by ICN nodes and ICN messages. For example, the data may be conveyed on the basis of CCN mechanisms as specified in ICNRG Internet-Drafts "CCNx Semantics", Version 01, January, 2016, and "CCNx Messages in TLV Format", Version 01, January 2016. However, other ICN, CCN or NDN mechanisms could be utilized as well. Accordingly, in the examples as further detailed below nodes will be referred to as ICN/CCN/NDN nodes, and messages will be referred to as ICN/CCN/NDN messages.

Figure 1:
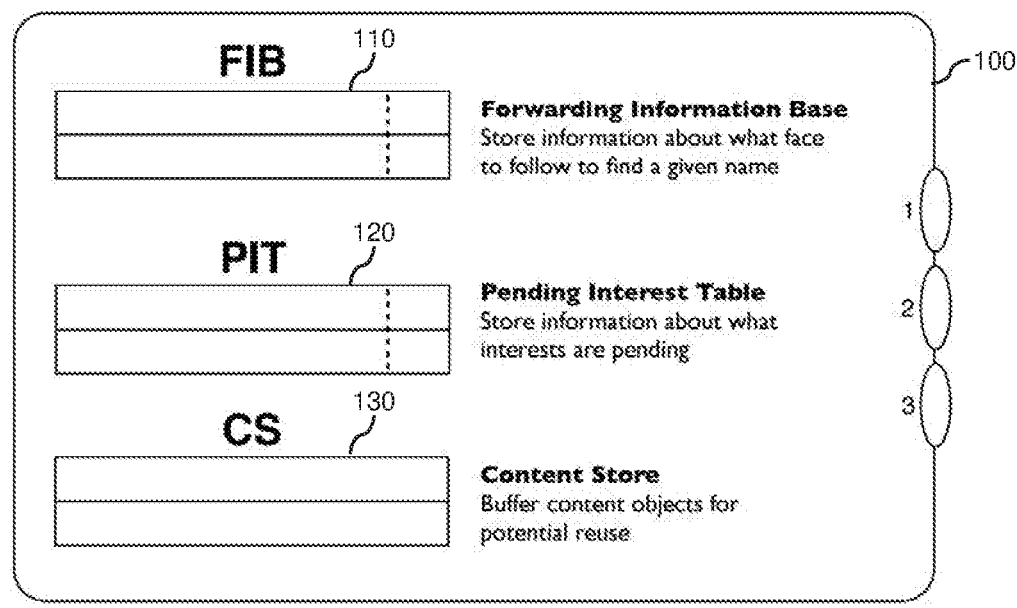
FIG. 1 schematically illustrates an ICN node as used in an embodiment of the invention.

In CCN, as may be utilized in the examples illustrated below, a Content Object is retrieved by issuing an Interest message to the network. The Interest message contains the name of the Content Object. Such a message is routed by the network towards the source/publisher of the Content Object. CCN Nodes along the path check if they have a cached copy of the object. If so they will respond to the Interest message with a Data message containing the requested Content Object and the Interest message will not be propagated any further. The routing is assisted by the name being a structured name (similar to domain names, but with richer syntax). Routers maintain a Forwarding Information Base (FIB) with information about where to forward which name or name prefix. The routers along the path of the Interest message keep a record of the Interest messages they have forwarded (where it came from and what Content Object it was naming) in a Pending Interest Table (PIT). If other Interest messages to the same name arrive to the router, it does not forward them, but just notes them in the PIT besides the entry for this name. This process is called Interest aggregation. As a result, the PIT entries for the same name may form a tree in the network with receivers as leafs. FIG. 1 shows an overview illustration of a CCN node 100 as presented in the keynote of the CCNx Conference 2013, September 5th & 6th, PARC, Palo Alto, Calif., available on the Internet under "http://security.riit.tsinghua.edu.cn/mediawiki/images/5/53/CCNx-Keynote_Edens.pdf". As illustrated, the CCN node 100 provides an FIB 110 which stores information about which interface (e.g. one of the interfaces) designated by "1", "2", and "3", should be used to find a content object of a given name. Further, the CCN node 100 provides a PIT 120 which stores information about what interests are pending. Further, the CCN node 100 provides a Content Store (CS) 130 which may buffer, i.e., temporarily store, content objects for potential reuse. ICN/CCN nodes as mentioned below may provide corresponding structures or functionalities.

Figure 2:
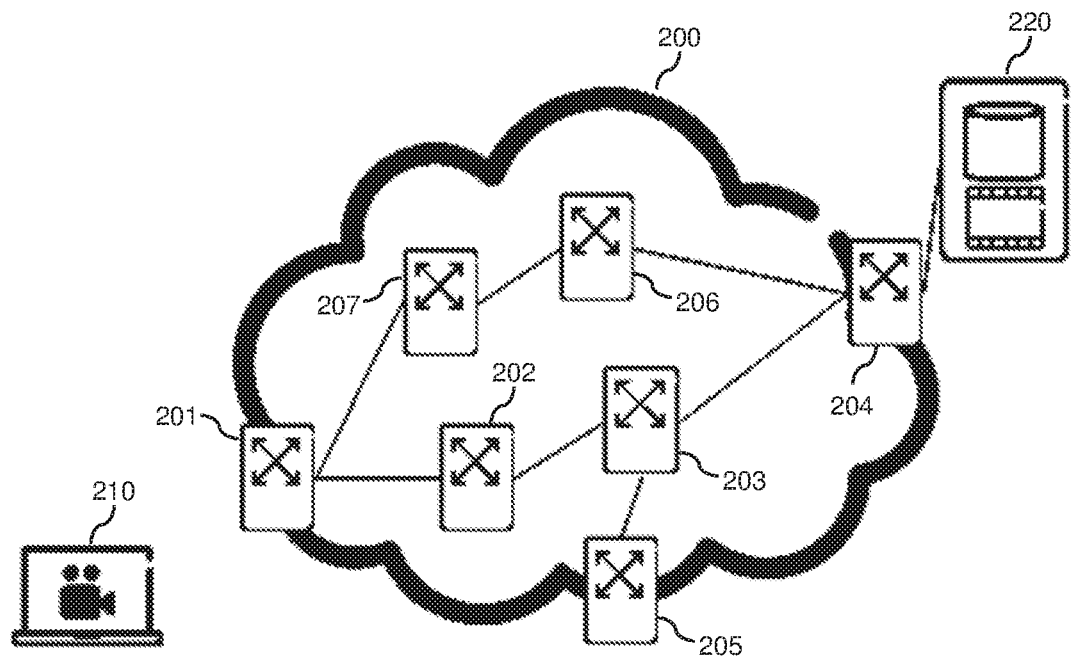
FIG. 2 shows an example of an ICN architecture according to an embodiment of the invention.

FIG. 2 schematically illustrates an exemplary CCN scenario. Specifically, FIG. 2 shows a network 200 with network elements 201, 202, 203, 204, 205, 206, 207 corresponding to CCN nodes, an end-device 210 coupled to the network 200, and a content source 220 coupled to the network 200. The CCN nodes 201, 202, 203, 204, 205, 206, 207 may correspond to routers. The end-device 210 may correspond to a user terminal, such as a UE with cellular network connectivity. The content source 220 may correspond to a server.

Figure 3A:
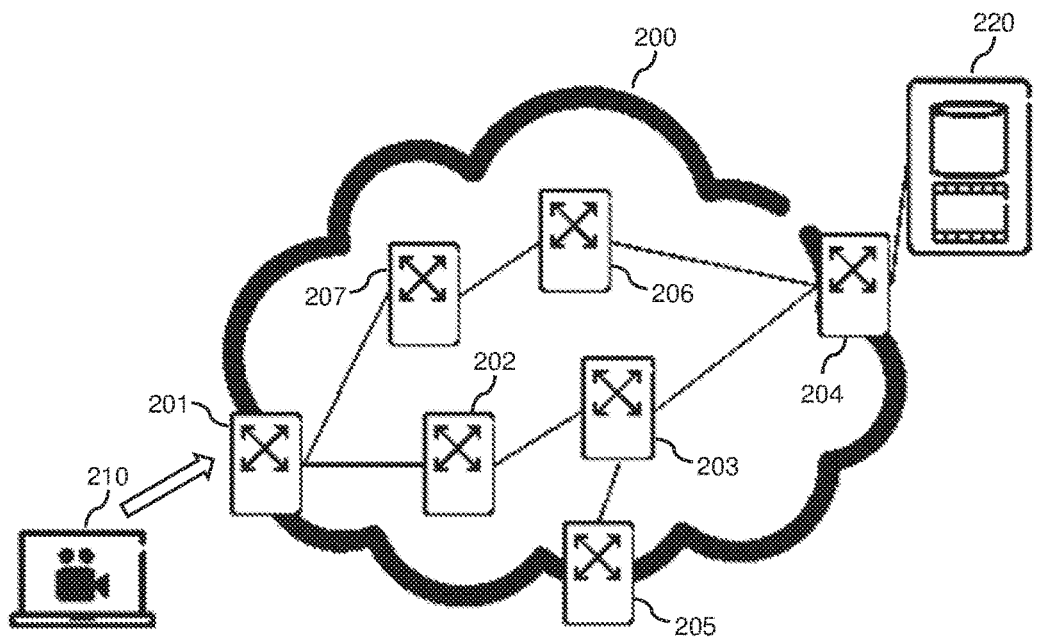
FIG. 3A-3E schematically illustrates various ICN networking scenarios according to embodiments of the invention.

FIG. 3A to 3E are based on the scenario of FIG. 2 and illustrate various aspects of ICN/CCN including prefix routing, caching at ICN/CCN nodes, i.e., temporary storage of a Content Object in the CS, and optimized delivery of cached Content Objects. Specifically, FIG. 3A shows that the end-device 210 sends an Interest message (illustrated by the arrow) to request a Content Object which is available from the content source 220. The Interest message identifies the Content Object by a name.

Figure 3B:
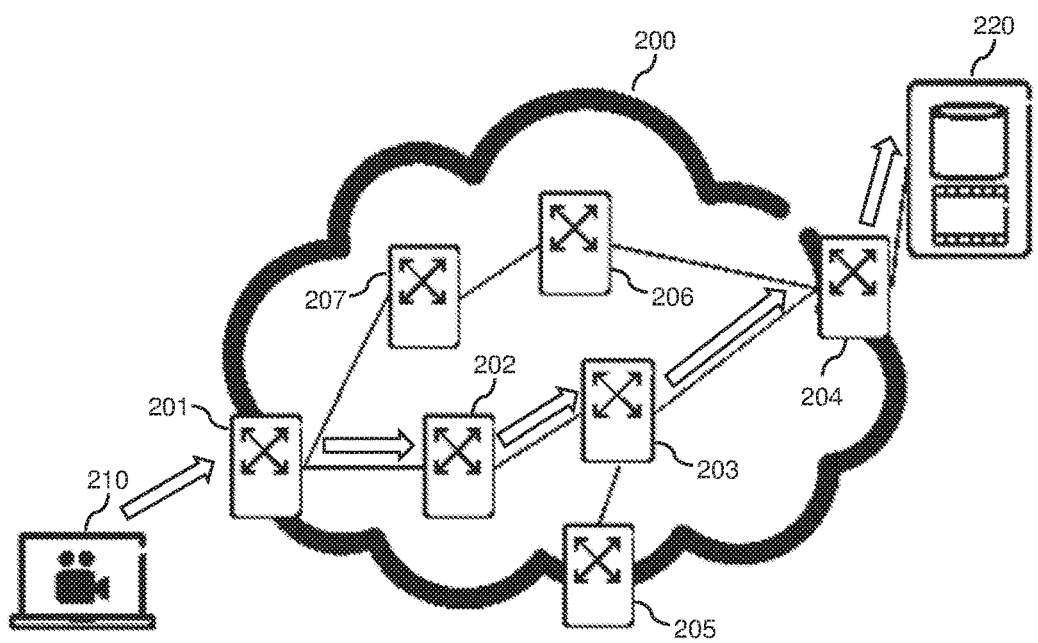
Figure 3C:
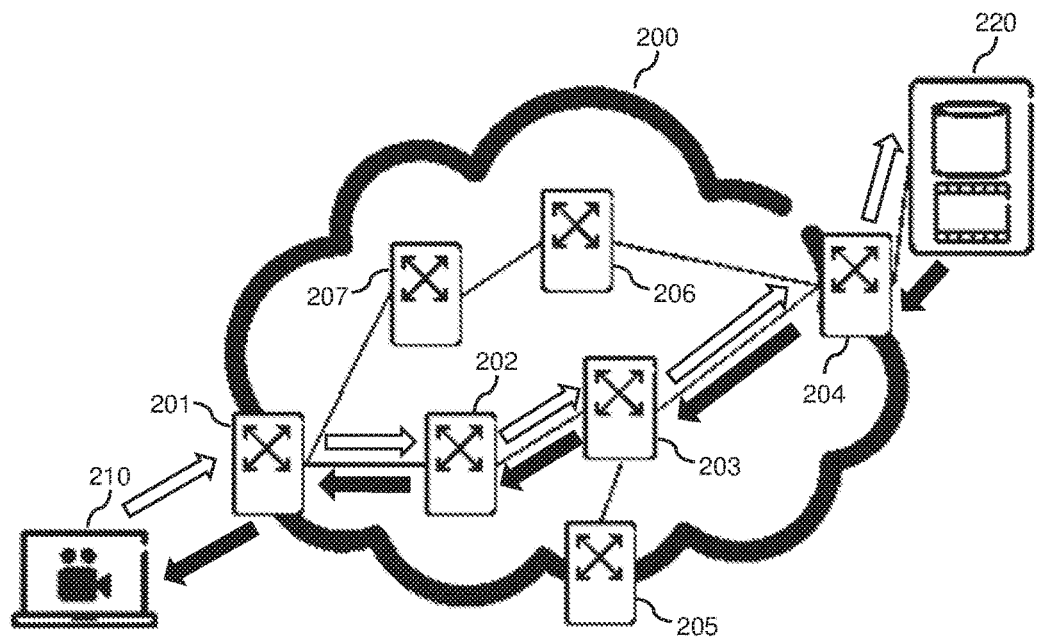

As a next step, FIG. 3B illustrates prefix routing to determine a route through the network 200 to the requested Content Object. The prefix routing utilizes a part of the name of the content object, referred to as prefix, and matching of the prefix to entries of the FIB of the CCN nodes 201, 202, 203, 204, 205, 206, 207. As indicated by the arrows in FIG. 3B, a route from the end-device 210 to the content source 220, extending via the CCN nodes 201, 202, 203, 204, is obtained in this way. At each of these CCN nodes, it is checked whether the Content Object is locally available in the CS, and if this is not the case, the Interest is forwarded to the next-hop CCN node, and a corresponding entry is stored in the PIT. In the illustrated scenario, it is assumed that the Content Object is available only at the content source 220 and the Interest is thus propagated up to the content source to 220. As a next step, FIG. 3C illustrates caching of the Content Object at the CCN nodes along the determined route. In particular, the Content Object is provided in Data messages from the content source 220 via the CCN nodes 204, 203, 202, 201 to the end-device 210, as illustrated by the solid arrows, and the content object is cached by each of the CCN nodes 204, 203, 202, 201.

Figure 3D:
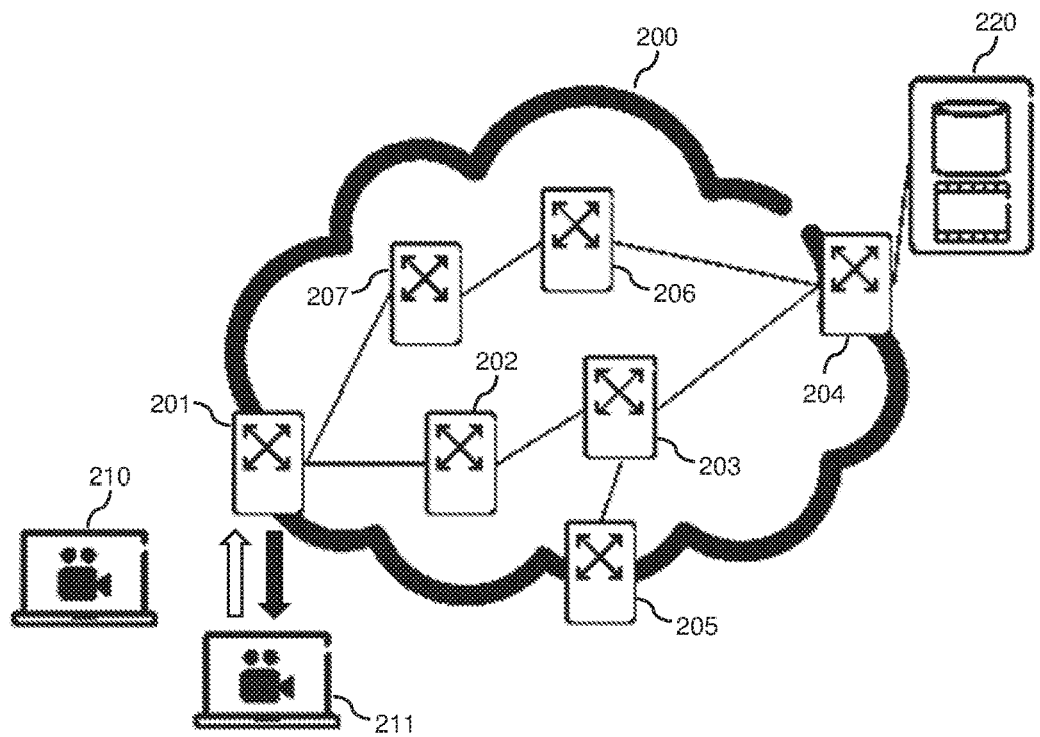

As illustrated by FIG. 3D, the caching of the Content Object may be utilized for optimized content delivery. In the example of FIG. 3D, another end-device 211 requests the same Content Object by sending an Interest message naming this Content Object (illustrated by an open arrow) to the CCN node 201. Because the content object is cached at the CCN node 201, the CCN node 201 can directly respond to the end-device 211 with a data message including the requested Content Object (illustrated by a solid arrow), without further propagating the Interest.

Figure 3E:
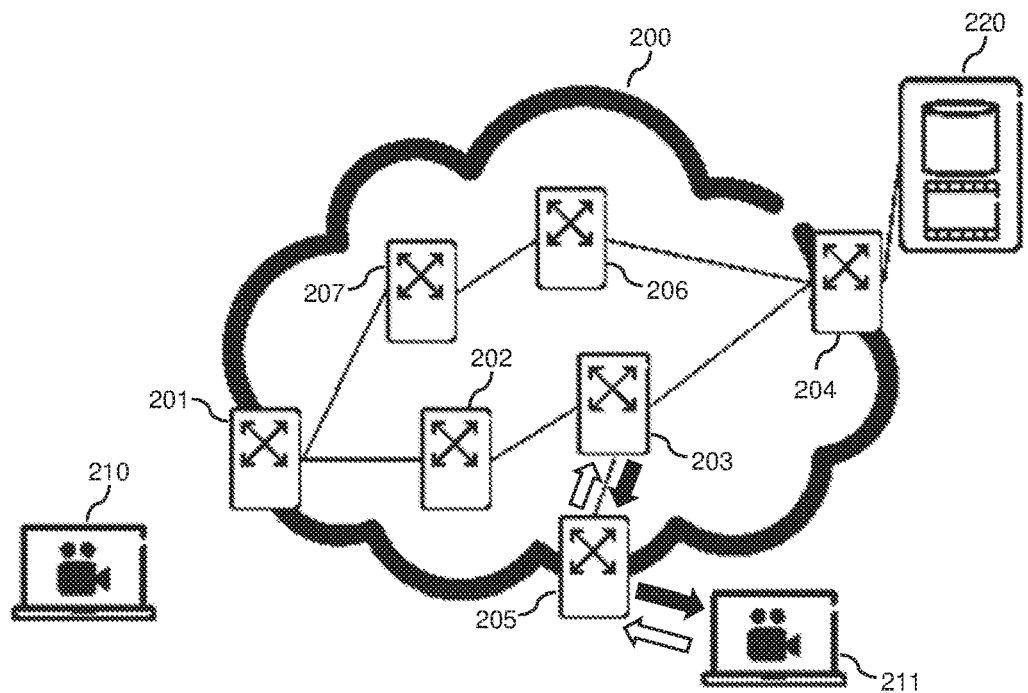

As illustrated by FIG. 3E, also mobility of the end-device may be handled in an efficient manner. In the example of FIG. 3E, it is assumed that the end device 211 moved and is now connected to the CCN node 205 before the requested Content Object was delivered to the end device 211. This is addressed by the end-device 211 resending the Invite message, thereby informing the ICN network 200 that the end-device 211 moved and initiating updating of the FIBs and PITs. In the illustrated example, a route to the content object, which is cached at the CCN node 203 is determined by prefix routing, as indicated by open arrows, and the content object can then be delivered from the CCN node 203 via the CCN node 205 to the end device 211, as indicated by solid arrows.

Accordingly, when the Interest message reaches an endpoint (or router) having a copy of the Content Object (perhaps cached), the Interest message is responded to with a Data message, which is propagated backwards along the path the Interest message took. The backward path is learned from the entries the Interest message left in the PIT of the routers along the path. If there were multiple Interests arriving at a router for this name, the Data message containing the Content Object is replicated towards each direction, where the Interest messages came from. After forwarding a Content Object matching a pending Interest, the routers delete the corresponding entry in the PIT, thus these entries are expected to be short-lived. When the original endpoint(s) generating the Interest message(s) receive the Content Object the transaction is considered closed.

The Interest aggregation mechanism typically forms a hierarchical tree in the ICN/CCN network where request packets are aggregated and response packets are de-aggregated at each level of the tree. This allows ICN networks to scale with increasing number of clients.

Figure 4:
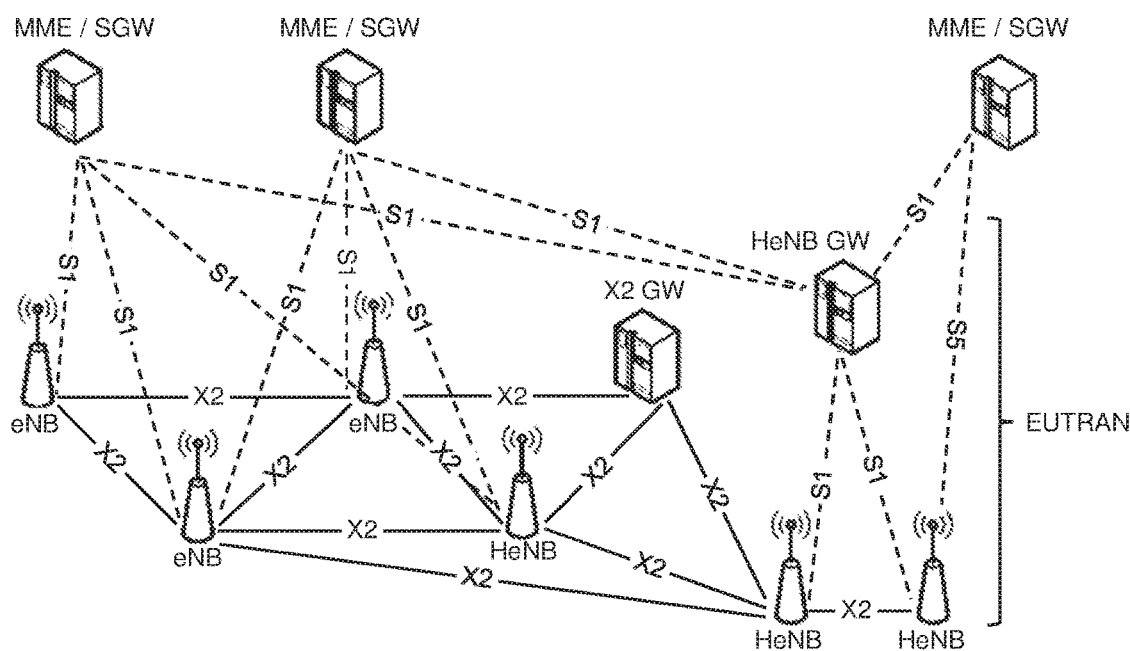
FIG. 4 shows an example of an LTE cellular network architecture as used according to an embodiment of the invention.

FIG. 4 illustrates architecture elements of a cellular network based on the LTE technology as defined in 3GPP TS 36.300 V13.2.0 (2015-12). As illustrated, in this case the cellular network includes radio access nodes in the form for eNBs and HeNBs (HeNB: Home eNB). The eNBs and HeNBs are connected by interfaces referred to as "X2". Further architecture elements include an X2 Gateway (X2 GW), an HeNB Gateway (HeNB GW), and MME/S-GWs. As illustrated, the X2 GW may serve as on optional intermediate node of the X2 interface between two or more of the eNBs and HeNBs. The MME/S-GWs and the HeNB GW serve as control nodes and data plane gateways for the eNBs and HeNBs and are connected thereto via interfaces referred to as "S1". As further illustrated, an HeNB may also be connected to an MME/S-GW via an interface referred to as "S5". The eNBs and HeNBs (as well as the X2 GW and the HeNB GW) are regarded as elements of the Evolved UMTS Terrestrial Radio Access Network (E-UTRAN), and the MME/S-GWs are regarded as elements of the Evolved Packet Core (EPC) of the Evolved Packet System (EPS).

The EPS includes the E-UTRAN the EPC and LTE capable UEs. Two different connection management states are defined in which the UE can be, which are referred to as ECM-IDLE (or "IDLE") and ECM-CONNECTED (or "ACTIVE). In ECM-IDLE, the UE position is known on Tracking Area (TA) level. Such TAs can consist of one or more cells. The UE does not have any active RRC (Radio Resource Control) or S1 connection. To reach the UE, the MME in the EPC will initiate paging by sending paging messages over S1 to the eNBs in the TA(s) that the UE is located in. The eNBs will then page the UE over the LTE radio interface (referred to as Uu interface). In ECM-CONNECTED, the UE position is known on cell level in the E-UTRAN and there is an active RRC and S1 connection. This state is used for data transmission to and from the UE, and when the UE moves the UE will be handed over to other cells. Inactive UEs are typically released to ECM-IDLE state in order to reduce UE battery consumption and to minimize signalling in the network.

One possibility for introducing ICN/CCN enhancements in a cellular network is to introduce ICN/CCN router functionality in the cellular base station (or in the vicinity of the cellular base station), e.g., in or in the vicinity of the eNBs or HeNBs as shown in FIG. 4. In this case the base station can provide connectivity for the cellular user equipment (UEs) to the nearest ICN/CCN router. Such a case is illustrated below when CCN router functionality is included in an LTE eNB. In such cases it is still likely that the cellular network (e.g. MMEs, eNBs) would still control mobility events such as handovers and state transitions, e.g., between ECM-CONNECTED and ECM-IDLE and vice versa.

One particular problem that could occur in this type of ICN/CCN solution is that the UE could have issued an Interest message for a Content Object, but not yet have received the Content Object, i.e., have a pending ICN request in the ICN/CCN network, but is otherwise inactive in the cellular network and is therefore released to ECM-IDLE state. In this case, when the Content Object arrives at the eNB which recently served the UE, there is no way for the eNB to deliver the Content Object to the UE, since the UE is no longer reachable on cell level.

In the concepts as illustrated herein, the above-mentioned problem and similar problems, e.g., arising from mobility of the UE while in ECM-IDLE, are addressed by using a correlation of an identifier of the UE to the pending ICN request. Based on this correlation, an access node, such as an ENB, can control connection of the UE to the cellular network. For example, if the correlation indicates that there is no pending ICN request and the UE is otherwise inactive, the access node may release the connection of the UE to the cellular network, e.g., by initiating a transition of the UE to the ECM-IDLE state. Further, if the correlation indicate that there is a pending ICN request, the access node may prevent releasing the connection, e.g., by keeping the UE in the ECM-CONNECTED state.

Accordingly, embodiments as described herein relate to a communication scenario between an eNB in an LTE-RAN, and in ICN/CCN node in an ICN/CCN network. A UE is in the coverage area of the eNB. The UE has an identifier applicable to making a request for content via the ICN/CCN network. The UE identifier can be embodied or can comprise an UE (context) identity or any other identity in relation to making the request. ICN information, such as the PIT of the ICN node, is correlated with the identifier of the UE. This correlation can be also called an association or a connection or linking.

One embodiment is to avoid releasing inactive UEs with an active request in the PIT. The eNB would in this case check the PIT for any pending request for a specific UE when the inactivity timer times out for that UE. If there is no entries in the PIT the eNB will release the UE to ECM-IDLE (which may be done by sending RRC connection release message). If there is a pending ICN request, the eNB will not release the UE. In the latter case the eNB could for instance start another timer which governs how long the eNB should wait for the pending interest to go away before releasing the UE.

Another embodiment involves that if the eNB has released a UE to ECM-IDLE with a pending ICN request in the PIT, the eNB or an ICN node would remember the UE identity associated with the pending request and initiate paging for the UE when the data object associated with that pending request arrives. Paging of the UE involves that one or more eNBs send a paging message to the UE. The paging message can either be sent directly by the eNB in the cell the UE was connected to or a trigger can be sent to the MME to initiate paging. In case the UE returns to the same ICN node it should be possible to deliver the data object to the UE either directly because the ICN node knows it is the same UE, or by the UE re-requesting the object which the ICN node now has in its cache. The identity used for associating the pending request can be a S-TMSI of the UE, a S5 GTP identity of the UE, or a C-RNTI of the UE used in EPS. However, any other identity could be used as well.

The illustrated embodiments allow to make sure that the data object that the UE has requested will be delivered when it arrives. It can be avoided that the UE needs to re-request the object based on some timer, which could add unnecessary signaling or delays.

Figure 5:
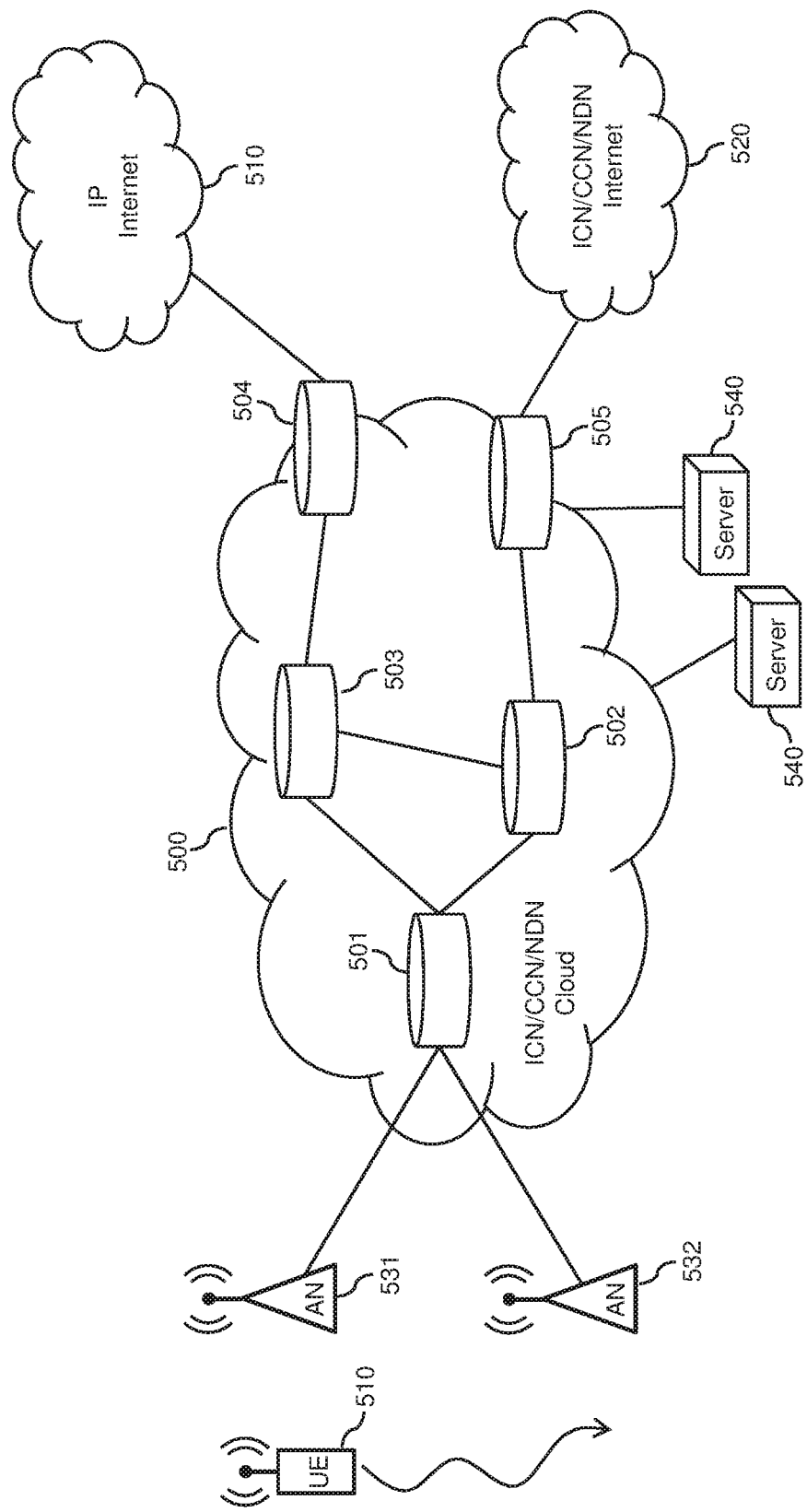
FIG. 5 shows an example of integrating ICN mechanisms in a cellular network according to an embodiment of the invention.

In the following, several aspects of the present disclosure will be discussed. These aspects are based on the overall assumption that an ICN/CCN network is integrated into a cellular network. An example of integrating the ICN/CCN network with a cellular network is shown in FIG. 5. As illustrated in FIG. 5, an ICN/CCN/NDN cloud 500 includes ICN nodes 501, 502, 503, 504, 505. The ICN/CCN/NDN cloud 500 is connected to an IP based part of the Internet, referred to as IP Internet 510, and to an ICN/CCN/NDN based part of the Internet, referred to as ICN/CCN/NDN Internet 520. Access nodes 531, 532 are connected to the ICN/CCN/NDN cloud 500, and a UE 510 may access the IP Internet 510 and/or the ICN/CCN/NDN Internet 520 via these access nodes 531, 532, and move between these access nodes 531, 532. As further illustrated, the ICN/CCN/NDN cloud 500 may also be connected to servers 540, which may for example store content and/or provide services.

Figure 6:
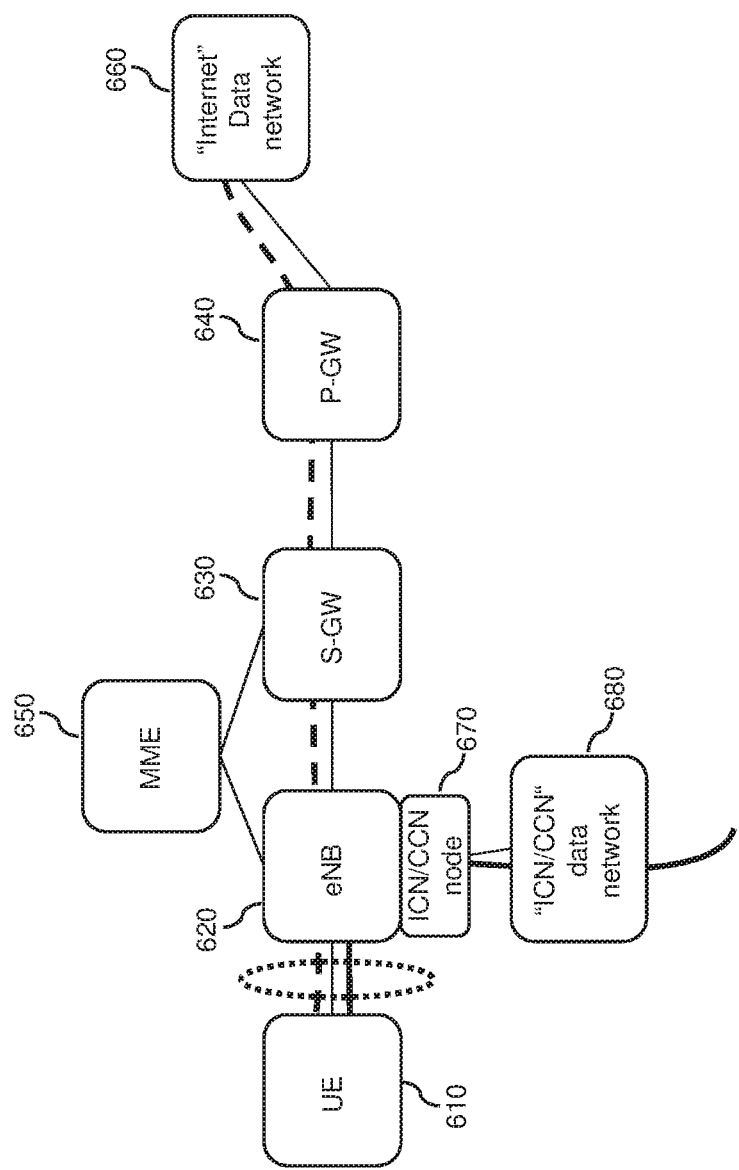
FIG. 6 shows an example of integrating ICN mechanisms with network architecture elements of the LTE technology according to an embodiment of the invention.

FIG. 6 further illustrates a how the ICN/CCN network may be integrated with elements of a cellular network based on the LTE technology. As illustrated in FIG. 6, an eNB 620 provides access a UE 610 with access to the cellular network. Through an ICN/CCN node 670, the UE 610 may access an ICN/CCN data network 680. As illustrated, this access may be implemented directly at the eNB 620. For example, the ICN/CCN node could be co-located with the eNB 620 or integrated in the eNB 620. Further, the UE 610 may access an "Internet" data network 660 through an S-GW 630, and a P-GW (Packet Data Network Gateway) 640, controlled by an MME 650, i.e., through the EPC. Accordingly, ICN/CCN traffic does not need to pass though the S-GW 630 and PGW 640. Mobility for the ICN/CCN traffic may be handled by the ICN/CCN network while radio handovers to or from other eNBs may be handled by the eNB 620 and the MME 650.

Figure 7:
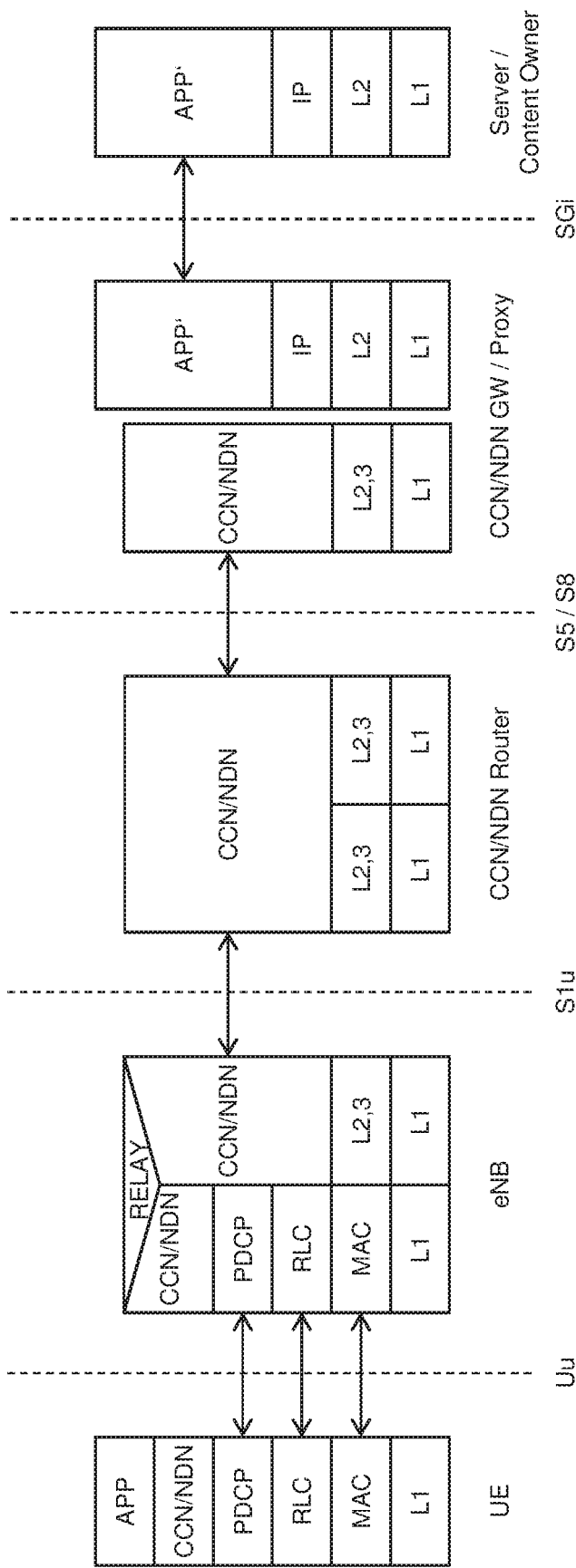
FIG. 7 shows an example of a protocol stack which may be used according to an embodiment of the invention.

FIG. 7 illustrates an example of a data plane protocol stack which may be utilized in a scenario as illustrated in FIG. 6. As can be seen, a CCN/NDN protocol layer may be arranged between an application level protocol layer (APP) and lower protocol layers. On the Uu radio interface of the LTE technology, these lower protocol layer would include a PDCP (Packet Data Convergence Protocol) layer, an RLC (Radio Link Control) layer, a MAC (Medium Access Control) layer, and a physical layer (also referred to as L1). On the other interfaces, i.e., an S1 u interface between eNB and CCN/NDN router (such as one of the ICN nodes 501, 502, 503), and an S6/S8 interface between CCN/NDN router and CCN/NDN GW/proxy (such as one of the ICN nodes 504, 505), other L1, L2, and/or L3 protocols may be used, depending on the implementation of these interfaces. Between CCN/NDN GW/proxy and a server or content owner (such as one of the servers 640 or a content source accessible through the IP Internet 510), the ICN/CCN traffic may be conveyed over the SGi interface, without using ICN/CCN/NDN protocol enhancements.

As mentioned above, the ICN nodes (such as the ICN/CCN node 670 of FIG. 6) maintain a PIT with entries for each pending ICN request for a data object. In the case of CCN, such pending ICN request would be a pending Interest for a Content Object. For efficiently supporting mobility of UEs and various connection states of UEs, such as ECM-IDLE and ECM-CONNECTED, a UE context identifier may be linked with the pending ICN request in the PIT.

Accordingly, whenever the ICN functionality in the ICN node integrated in the cellular network receives a request for a data object that it does not have stored in its cache, it will add the ICN request to the PIT. Typically, in a normal ICN operation it would be enough to associate this ICN request with the interface over which the request was received so that the ICN node can send the requested data object back over the same link. In the concepts as illustrated herein, with ICN network being integrated in the cellular network, the ICN request is further associated with a UE context, so that the eNB (or similar access node) can deliver the data object to the right UE. According to the illustrated concepts, this UE context association may be used to also link the information in the PIT with the UE state or context identifiers used for paging the UE in ECM-IDLE. The associated UE context identifier could be the S-TMSI (Temporary Mobile Subscriber Identity for S type interface), the GUTI (Global Unique Temporary Identity) or the IP address of the UE, or the MME UE S1AP ID (S1 Application Protocol Identifier) or eNB UE S1AP ID used as identifier over S1, or the C-RNTI (Cell Radio Network Temporary Identity) used for scheduling over the radio interface, or a new identifier used specifically for ICN/CCN, or an S5 GTP (S5 GPRS Tunneling Protocol) identity, e.g., S5 GTP TEID (S5 GTP Tunnel Endpoint Identifier), assuming there is an S5 interface between eNB and S-GW, or any other identifier. This identifier could be stored in the PIT for each UE request.

Accordingly, the eNB may store a UE identity when the UE is released to ECM-IDLE and also when the UE is in ECM-CONNECTED. For some kind of UE identifier, such as S-TMSI or GUTI, this requires that the identifier is provided to the eNB, e.g., from the MME (using S1 signaling) or from other eNBs (using X2 signaling) in case of handover for all UEs using ICN/CCN.

In some aspects, the illustrated concepts may be used to avoid releasing a UE to ECM-IDLE if it has a pending ICN request. As mentioned above, one embodiment of the present disclosure is to avoid releasing inactive UEs with an active request in the PIT. The eNB would in this case check the PIT for any pending request for a specific UE when the inactivity timer times out for that UE. The inactivity timer in this case could be a common timer used by the eNB to release any UEs to ECM-IDLE when they have not had any traffic for a while. Given that the ICN network might need to retrieve the content from several hops away it could have happened that this timer has timed out before the data object reaches the eNB. This checking may be based on the UE context identity being stored in the PIT, as further explained below.

If there are no entries in the PIT which are associated with the UE context identifier, the eNB may release the UE to ECM-IDLE. This may be done by the eNB requesting the MME to release the UE, which results in that the S1 connection of the UE is released and the eNB sends a RRC connection release message to the UE to release the RRC connection.

If there is one or more pending request the eNB will not release the UE. In this case the eNB can wait and re-evaluate the need to release UE once the data object(s) associated with the pending request(s) has/have been delivered (i.e. when the pending request has been removed). In some scenarios, it is also possible for the eNB to start a timer associated with the pending request(s), and if the pending request(s) is/are still there (i.e. the request has not been fulfilled) when the associated timer has timed out, the eNB can release the UE to ECM-IDLE state anyway. The latter solution can be used to avoid that UEs are kept too long in ECM-CONNECTED.

Figure 8:
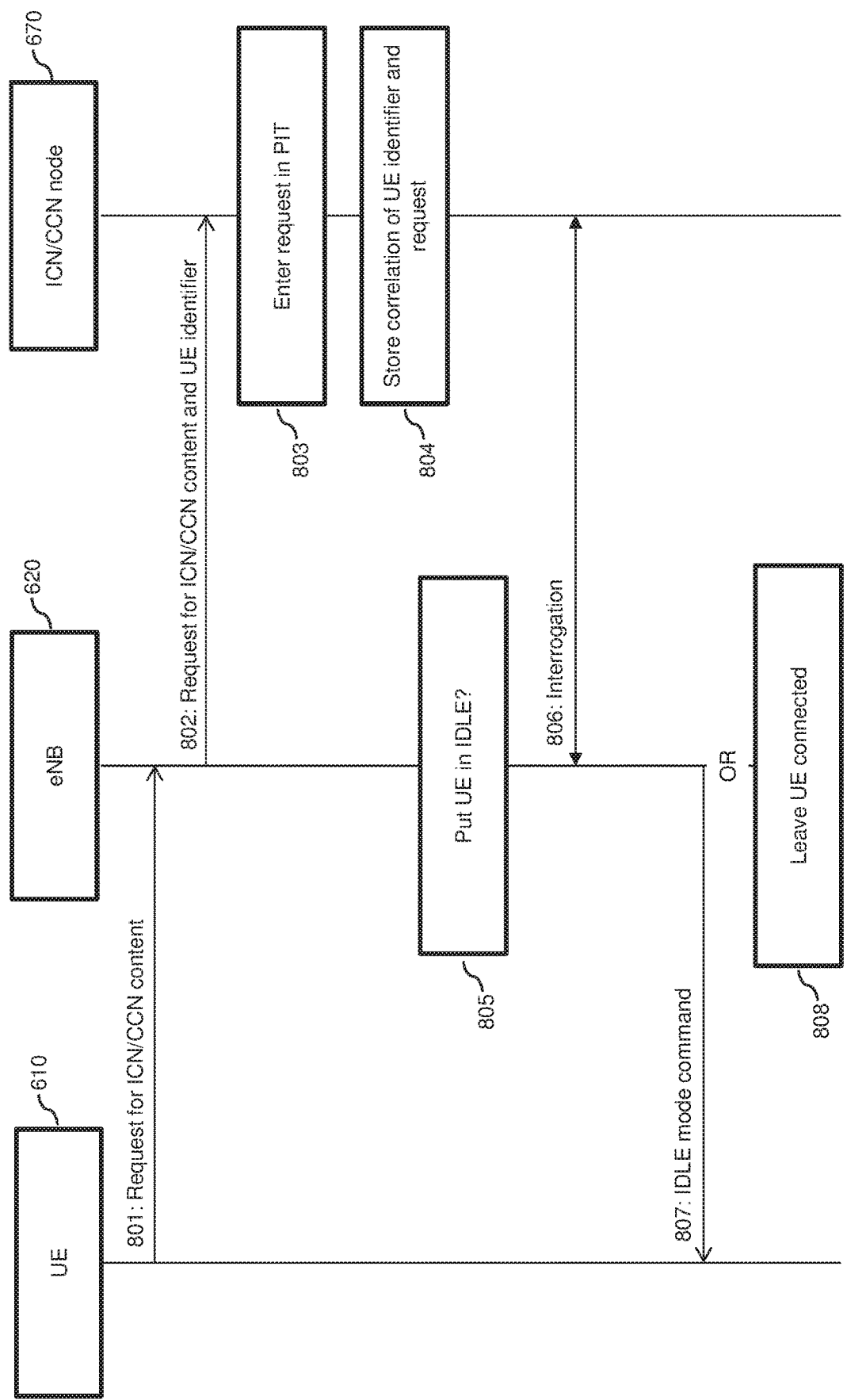
FIG. 8 shows exemplary processes according to an embodiment of the invention, which involve control of releasing of a UE to idle mode.

FIG. 8 illustrates exemplary processes which may be used for implementing the above control of releasing of a UE to ECM-IDLE. The processes of FIG. 8 involve the UE 610, the eNB 620, and the ICN/CCN node 670.

As illustrated by message 802, the UE 610 may send an ICN request for a data object (e.g., certain content) to the eNB 620. The eNB 620 may forward the ICN request together with a UE identifier to the ICN/CCN node 670. As mentioned above, the UE identifier may include an S-TMSI, a GUTI, an IP address, an MME UE S1AP ID, an eNB UE S1AP ID, a C-RNTI, or an S5 GTP TEID, or the like. If needed, the eNB 620 may obtain the identifier from another node, e.g., from the MME 650.

In the illustrated example, it is assumed that the requested data object is not cached at the ICN/CCN node 670, and the ICN/CCN request is thus propagated by the ICN/CCN node 670 to the ICN/CCN data network. As illustrated by step 803, the ICN/CCN node 670 further enters the request in the PIT maintained by the ICN/CCN node 670.

As further illustrated by step 804, the ICN/CCN node stores a correlation of the UE identifier and the request. For example, this may be accomplished by storing the UE identifier in an entry of the PIT which corresponds to the request. In some scenarios, when multiple UEs have requested the same data object, the PIT entry corresponding to the request may include multiple UE identifiers.

As illustrated by step 805, at some time the eNB 620 may then need to decide whether to release the UE 610 to ECM-IDLE. For example, the UE 610 may have been inactive for some time, which may be detected based on expiry of an inactivity timer. To save battery and signaling resources, it may thus be desirable to release the UE 610 to ECM-IDLE. However, the decision whether to release the UE 610 to ECM-IDLE is also based on whether there is a pending ICN request of the UE.

Accordingly, the eNB 620 interrogates with the ICN/CCN node 670 whether there is a pending ICN request of the UE 610 in the PIT, as illustrated by signaling 806. The interrogation is based on the UE identifier and the stored correlation of the UE identifier to the request in the PIT.

If the correlation indicates that there is no request from the UE 610 in the PIT (e.g., because the requested data object was already delivered to the UE 610), the eNB 620 may release the UE 610 to ECM-IDLE by sending an IDLE mode command 807 to the UE 610. For example, the eNB 620 may request the MME 650 to release the UE 610, and the IDLE mode command 807 may then correspond to an RRC connection release message. Alternatively, if the correlation indicates that there is no request from the UE 610 in the PIT, the eNB 620 may leave the UE 610 in the ECM-CONNECTED state, as indicated by step 808.

Figure 9:
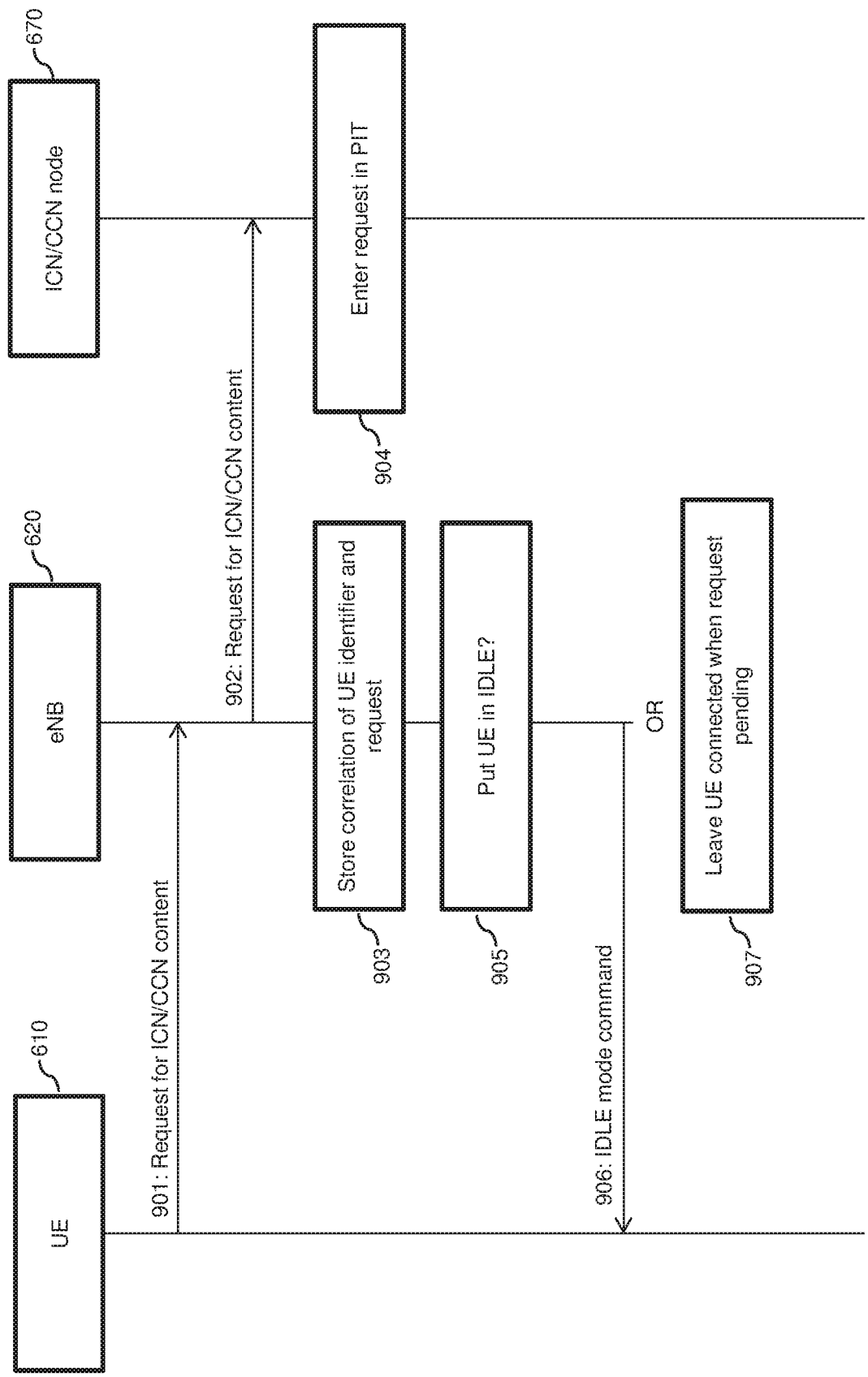
FIG. 9 shows further exemplary processes according to an embodiment of the invention, which involve control of releasing of a UE to idle mode.

FIG. 9 illustrates further exemplary processes which may be used for implementing the above control of releasing of a UE to ECM-IDLE. The processes of FIG. 9 involve the UE 610, the eNB 620, and the ICN/CCN node 670.

As illustrated by message 902, the UE 610 may send an ICN request for a data object (e.g., certain content) to the eNB 620. The eNB 620 may then forward the ICN request to the ICN/CCN node 670.

As further illustrated by step 903, the eNB 620 stores a correlation of a UE identifier and the request. For example, the eNB 620 may store a name of the data object together with the UE identifier as an indication that there is a pending request for the data object in the PIT of the ICN/CCN node 670. When the data object is delivered to the UE 610, this indication may be deleted. As mentioned above, the UE identifier may include an S-TMSI, a GUTI, an IP address, an MME UE S1AP ID, an eNB UE S1AP ID, a C-RNTI, or an S5 GTP TEID, or the like. If needed, the eNB 620 may obtain the identifier from another node, e.g., from the MME 650.

In the illustrated example, it is assumed that the requested data object is not cached at the ICN/CCN node 670, and the ICN/CCN request is thus propagated by the ICN/CCN node 670 to the ICN/CCN data network. As illustrated by step

904, the ICN/CCN node 670 further enters the request in the PIT maintained by the ICN/CCN node 670.

As illustrated by step 905, at some time the eNB 620 may then need to decide whether to release the UE 610 to ECM-IDLE. For example, the UE 610 may have been inactive for some time, which may be detected based on expiry of an inactivity timer. To save battery and signaling resources, it may thus be desirable to release the UE 610 to ECM-IDLE. However, the decision whether to release the UE 610 to ECM-IDLE is also based on whether there is a pending ICN request of the UE. In the processes of FIG. 9, the eNB 620 may use the locally stored correlation of the UE identifier to pending request(s) to determine whether there is a pending ICN request of the UE 610 in the PIT.

If the correlation indicates that there is no request from the UE 610 in the PIT (e.g., because the requested data object was already delivered to the UE 610), the eNB 620 may release the UE 610 to ECM-IDLE by sending an IDLE mode command 906 to the UE 610. For example, the eNB 620 may request the MME 650 to release the UE 610, and the IDLE mode command 807 may then correspond to an RRC connection release message. Alternatively, if the correlation indicates that there is no request from the UE 610 in the PIT, the eNB 620 may leave the UE 610 in the ECM-CONNECTED state, as indicated by step 907.

It is noted that in some scenarios the UE 610 could also be released to ECM-IDLE if the correlation indicates that there is a pending ICN request from the UE 610. For example, such release could be triggered by expiry of a further timer, configured with a longer duration than the inactivity timer.

In some aspects, the illustrated concepts may also be used to handle cases when a requested the data object arrives for a UE that has already been released to ECM-IDLE: In cases where a UE with a pending request in the PIT has been released to ECM-IDLE, the eNB and/or ICN node can remember the UE identity associated with the pending request, i.e., maintain a correlation of the UE identity the request in the PIT, and initiate paging of the UE when the data object associated with that pending request arrives. In the following, various options of implementing this paging will be described.

According to a first option, the eNB may page the UE directly, e.g., using the S-TMSI of the UE in the local coverage area of the eNB. In other words, the eNB itself may send a paging message to the UE. When the UE receives the paging message (assuming it is still in the local area) the UE will typically contact the network by sending a NAS (Non Access Stratum) service request. This NAS service request will in turn trigger the setup of the RRC and S1 connection as well as user plane radio bearers for the UE, and the UE will enter the ECM-CONNECTED state. Once the user plane radio bearers are setup, the data object can be delivered to the UE by the eNB and/or ICN node. If the UE has moved to outside the local area of the eNB, the eNB will not receive a response to the paging message and can then optionally trigger paging according by one or more other eNBs, e.g., according to the second option as explained below. In the latter case, the eNB may have stored paging information for the UE, such as the paging identity to use, possible paging group the UE belongs to (or paging offset) and/or a DRX (Discontinuous Reception) period configured for the UE.

According to a second option, the eNB or ICN node may trigger paging of the UE by sending a message over S1 (or S11 interface) to the MME associated with the UE context (this can be determined by the UE S-TMSI or GUTI). The message indicates to the MME that the UE shall be paged. The MME may then initiate paging according to normal UE paging procedures. When the UE receives the page it will respond with a NAS service request which will trigger the setup of the RRC and S1 connection as well as user plane radio bearers, and the UE will enter the ECM-CONNECTED state. If the UE returns to an ICN node which also served the same areas as the UE was in before entering ECM-IDLE, this ICN node can also deliver the data object to the UE. If the eNB or ICN node also triggered the paging because the data object became available at the eNB/ICN node, the delivery of the data object can be done without UE re-requesting the object. If the UE connects to a different ICN node, the UE can re-request the data object. In the latter case, it is likely that the delivery of the data object to the new ICN node will be fast and long before the UE might time out to ECM-IDLE again, because the data object has already been delivered to an eNB or ICN node in the vicinity. In order to trigger the UE to re-request the data object, the network can send a message to the UE over the radio interface that the UE has entered a new ICN node so that any pending requests should be re-sent. This message can also include an identifier of the ICN node (e.g., an ICN node ID) which would make it possible for the UE to determine this information by itself.

According to a third option, it is assumed that there was an S5 interface configured between the S-GW serving the UE and the local eNB/ICN node to which the UE issued the ICN request. In this case the local eNB/ICN node can send a DL (Downlink) packet to the S-GW to trigger the S-GW to initiate paging by sending a Data Notification message to the MME. The DL packet could either be a dummy packet, or some ICN signaling, or the requested data object. An advantage of the latter option is that the ICN data object can be delivered to the UE even if the UE shows up (answers the page) at a different eNB/ICN node since the data can be delivered via the S-GW to that eNB/ICN node.

In addition to the above options it is also possible to add additional information in the page request sent to the UE based on ICN knowledge in the network. Possible information includes, without limitation, a flag indicating that the page is triggered from the ICN network, information about the data object that was received at the ICN node or eNB, e.g., the name of the data object, or a hash or checksum of the data object name. Using the hash or checksum may allow for reducing the size of the paging message. Including additional information with the paging may enable the UE or ICN application in the UE to decide if it wants to enter ECM-CONNECTED to receive the content or not. If for instance the UE has already determined it is no longer interested in the date object, it could ignore the page. Further, Including additional information with the paging may be used a trigger for the UE to re-send an ICN request or to register to the ICN network after it has responded to the page.

In addition to the above options it is also possible to utilize a special paging resource for ICN related paging. In this case all UEs which have pending ICN requests and that are sent to ECM-IDLE could monitor the ICN paging channel to see when there is ICN data for them. An advantage of this option could be that the eNB would not need to know the normal paging slots that the UE uses since the UE can be reached on the ICN paging channel/slots. It would also make it possible to apply different DRX periods for ICN and non-ICN data which would affect UE battery consumption and latency. By way of example, ICN paging slots could be more frequent to reduce the delay at the expense of more UE battery consumption if the UE has a pending ICN request.

Figure 10:
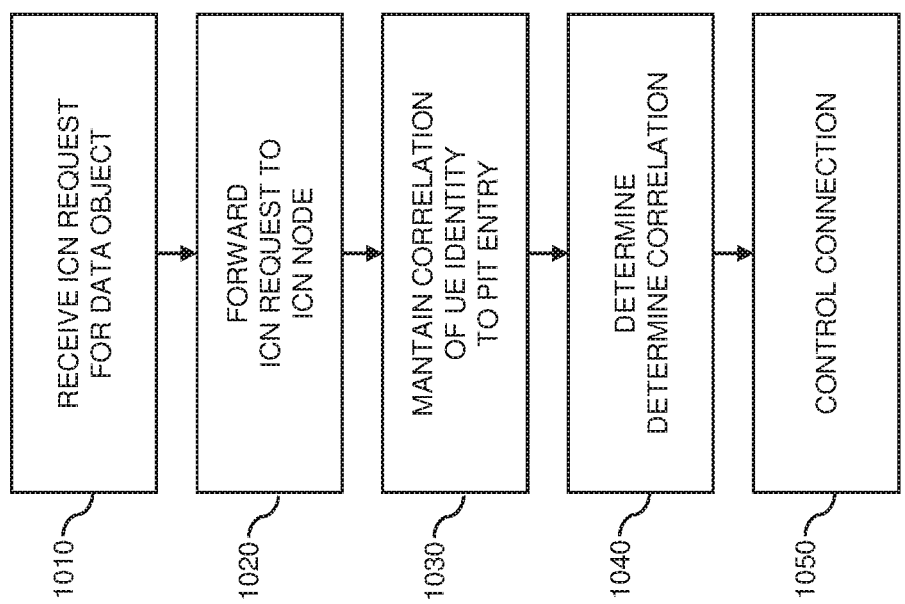
FIG. 10 shows a flowchart for schematically illustrating a method performed by an access node according to an embodiment of the invention.

FIG. 10 shows a flowchart for illustrating a method of conveying data in a cellular network. The method of FIG. 10 may be utilized for implementing the illustrated concepts in an access node of the cellular network, such as one of the access nodes 531, 532, or the eNB 620. If a processor-based implementation of the access node is used, the steps of the method may be performed by one or more processors of the access node. In such a case the access node may further comprise a memory in which program code for implementing the below described functionalities is stored.

At optional step 1010, the access node may receive an ICN request for a data object from a UE. In accordance with ICN principles, the ICN request identifies the data object by a name and is not addressed to a specific source of the data object. The ICN request may for example be an Interest message according to the CCNx specifications.

At optional step 1020, the access node may forward the ICN request to an ICN node. In accordance with ICN principles, the ICN node will maintain a PIT which includes an entry for each data object having a pending ICN request at the ICN node.

At optional step 1030, the access node may maintain a correlation of an identity of the UE with the entry of the PIT corresponding to the ICN request. The identity may include an S-TMSI, a GUTI, an IP address, an MME UE S1AP ID, an eNB UE S1AP ID, a C-RNTI, or an S5 GTP TEID. Maintaining the correlation may involve storing the identity of the UE at the access node, e.g., in a table, database, or the like. The identity may be stored in association with the ICN request, e.g., by linking it to the name of the requested data object. An example of corresponding processes is explained in connection with FIG. 9. In addition or as an alternative, maintaining of the correlation may involve indicating the identity of the UE to the ICN node, so that a correlation of the identity of the UE with the entry of the PIT can be maintained at the ICN node. An example of corresponding processes is explained in connection with FIG. 8.

At step 1040, the access node determines a correlation of an identifier of a UE, such as one of the UEs 210, 211, 510, 610 with an entry of a PIT maintained by an ICN node, such as one of the ICN nodes 201, 202, 203, 204, 205, 206, 207; 501, 502, 503, 504, 505, 670. The PIT includes an entry for each data object having a pending ICN request at the ICN node. The ICN request may correspond to the ICN request received at step 1010 and forwarded at step 1020. The correlation may correspond to the correlation as maintained at step 1030.

In some scenarios, step 1040 may involve that, based on the identity of the UE, the access node interrogates with the ICN node to determine whether an ICN request from the UE is pending at the ICN node. An example of corresponding processes is explained in connection with FIG. 8.

At step 1050, the access node controls a connection of the UE with the cellular network. This may involve that, in response to the correlation indicating that no ICN request from the UE is pending at the ICN node, the access node initiates releasing of the connection to the UE. Here, it is noted that other criteria for releasing the connection may exist as well, such as expiry of an inactivity timer. Further, step 1050 may involve that, based on the correlation indicating that a data object having a pending ICN request from the UE has become available at the ICN node, the access node initiates paging of the UE. For example, in this case the correlation may enable the access node to determine information required for paging the UE.

Paging of the UE may include sending a paging message to the UE. The paging message may indicate that the paging of the UE is due to a pending ICN request, e.g., in terms of a flag. In some scenarios, the paging message may also include information on the available data object, e.g., a name of the data object or a hash of the name of the data object. In some scenarios, the paging message may also include an indication for triggering re-sending of the ICN request.

Figure 11:
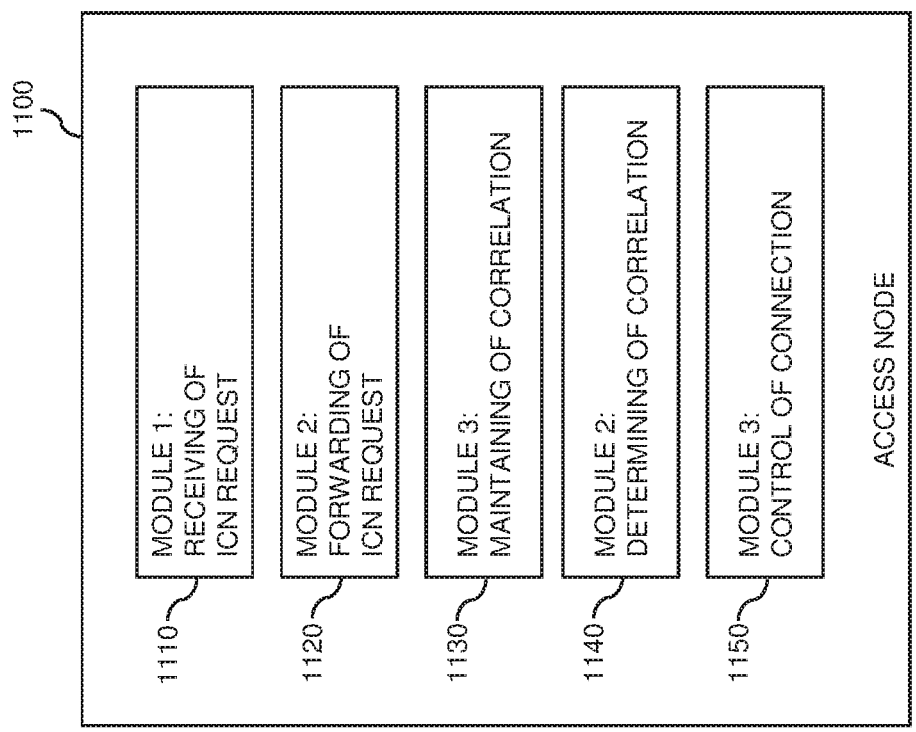
FIG. 11 shows a block diagram for illustrating functionalities of an access node according to an embodiment of the invention.

FIG. 11 shows a block diagram for illustrating functionalities of an access node 1100 which operates according to the method of FIG. 10. As illustrated, the access node 1100 may optionally be provided with a module 1110 configured to receive an ICN request from a UE, such as explained in connection with step 1010. Further, the access node 1100 may optionally be provided with a module 1120 configured to forward the ICN request to an ICN node, such as explained in connection with step 1020. Further, the access node 1100 may optionally be provided with a module 1130 configured to maintain a correlation of an identity of the UE with an entry of the PIT corresponding to the ICN request, such as explained in connection with step 1030. Further, the access node 1100 may be provided with a module 1040 configured to determine a correlation of an identity of a UE with an entry of a PIT, such as explained in connection with step 1040. Further, the access node 1100 may be provided with a module 1150 configured to control connection of the UE to the cellular network, such as explained in connection with step 1050.

It is noted that the access node 1100 may include further modules for implementing other functionalities, such as known functionalities of an eNB. Further, it is noted that the modules of the access node 1100 do not necessarily represent a hardware structure of the access node 1100, but may also correspond to functional elements, e.g., implemented by hardware, software, or a combination thereof.

Figure 12:
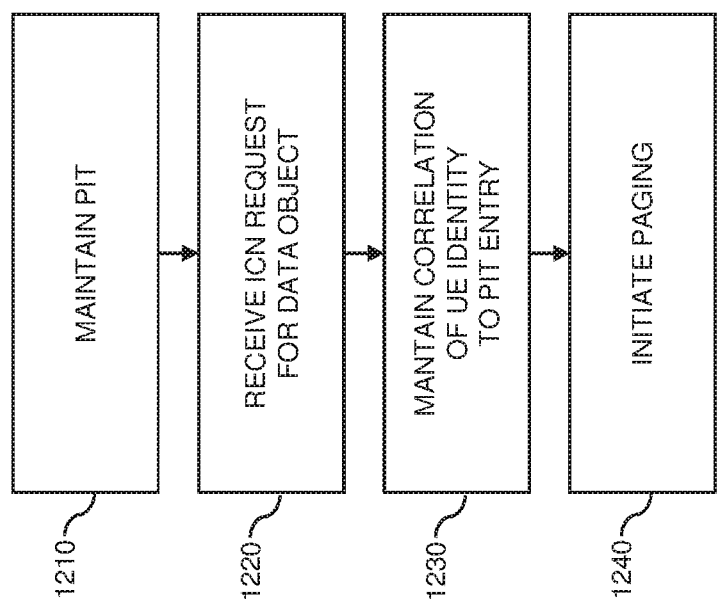
FIG. 12 shows a flowchart for schematically illustrating a method performed by an ICN node according to an embodiment of the invention.

FIG. 12 shows a flowchart for illustrating a method of conveying data in a cellular network. The method of FIG. 12 may be utilized for implementing the illustrated concepts in an ICN node, such as one of the ICN nodes 201, 202, 203, 204, 205, 206, 207; 501, 502, 503, 504, 505; 670. If a processor-based implementation of the ICN node is used, the steps of the method may be performed by one or more processors of the ICN node. In such a case the ICN node may further comprise a memory in which program code for implementing the below described functionalities is stored.

At step 1210, the ICN node maintains PIT. The PIT includes an entry for each data object having a pending ICN request at the ICN node.

At step 1220, the ICN node receives an ICN request for a data object. In accordance with ICN principles, the ICN request identifies the data object by a name and is not addressed to a specific source of the data object. The ICN request may for example be an Interest message according to the CCNx specifications. The ICN request is received from a UE connected to the cellular network, such as one of the UEs 210, 211, 50, 610. It is noted that the request may be received via one or more intermediate nodes, e.g., via an access node, such as one of the access nodes 531, 532, or the eNB 620, or even via a further ICN node. At step 1230, the ICN node maintains a correlation of an identifier of the UE with that entry of the PIT which corresponds to the requested data object. The identity may include an S-TMSI, a GUTI, an IP address, an MME UE S1AP ID, an eNB UE S1AP ID, a C-RNTI, or an S5 GTP TEID. Maintaining the correlation may involve storing the identity of the UE in the entry of the PIT. In addition or as an alternative, maintaining of the correlation may involve receiving the identity of the UE from an access node of the cellular network, such as one of the access nodes 531, 532, or the eNB 620. An example of corresponding processes is explained in connection with FIG. 8.

At optional step 1240, based on the correlation indicating that a data object having a pending ICN request from the UE has become available at the ICN node, the ICN node may initiate paging of the UE. Typically, paging may be initiated when the UE is in idle mode, i.e., does not have a data connection to the cellular network, such as when the UE is in the ECM-IDLE state.

Paging of the UE may include sending a paging message to the UE. The paging message may indicate that the paging of the UE is due to a pending ICN request, e.g., in terms of a flag. In some scenarios, the paging message may also include information on the available data object, e.g., a name of the data object or a hash of the name of the data object. In some scenarios, the paging message may also include an indication for triggering re-sending of the ICN request.

In some scenarios, the ICN node may interrogate with an access node of the cellular network to determine whether an ICN request from the UE is pending at the ICN node. The access node has a coverage area in which the UE is located. An example of corresponding processes is explained in connection with FIG. 8.

Figure 13:
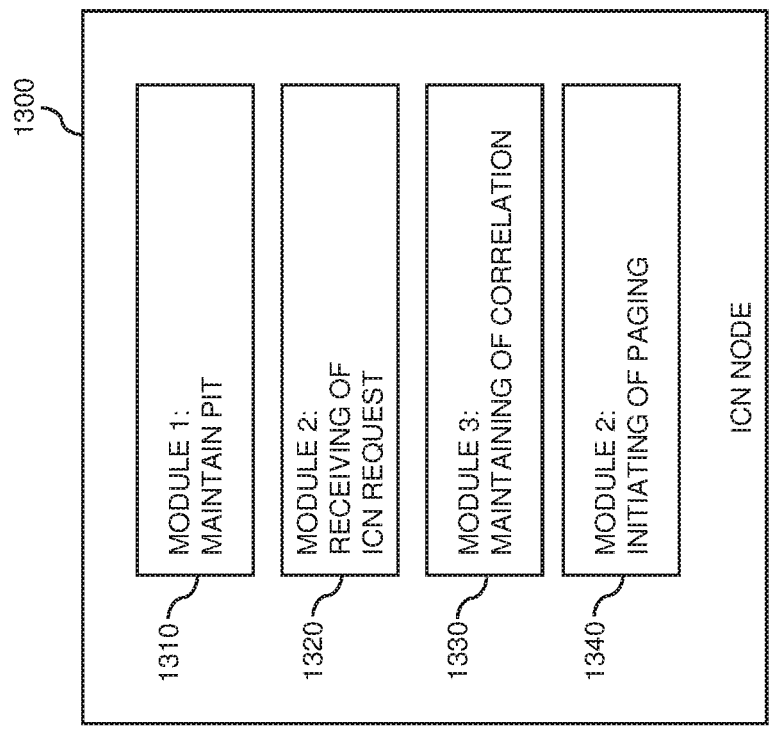
FIG. 13 shows a block diagram for illustrating functionalities of an ICN node according to an embodiment of the invention.

FIG. 13 shows a block diagram for illustrating functionalities of an ICN node 1300 which operates according to the method of FIG. 12. As illustrated, the ICN node 1300 may be provided with a module 1310 configured to maintain a PIT, such as explained in connection with step 1210. Further, the ICN node 1300 may be provided with a module 1320 configured to receive an ICN request from a UE, such as explained in connection with step 1220.

Further, the ICN node 1300 may be provided with a module 1330 configured to maintain a correlation of an identity of the UE with an entry of the PIT corresponding to the ICN request, such as explained in connection with step 1230. Further, the ICN node 1300 may optionally be provided with a module 1340 configured to initiate paging based on the maintained correlation, such as explained in connection with step 1240.

It is noted that the ICN node 1300 may include further modules for implementing other functionalities, such as known functionalities of an ICN/CCN/NDN node. Further, it is noted that the modules of the ICN node 1300 do not necessarily represent a hardware structure of the ICN node 1300, but may also correspond to functional elements, e.g., implemented by hardware, software, or a combination thereof.

Figure 14:
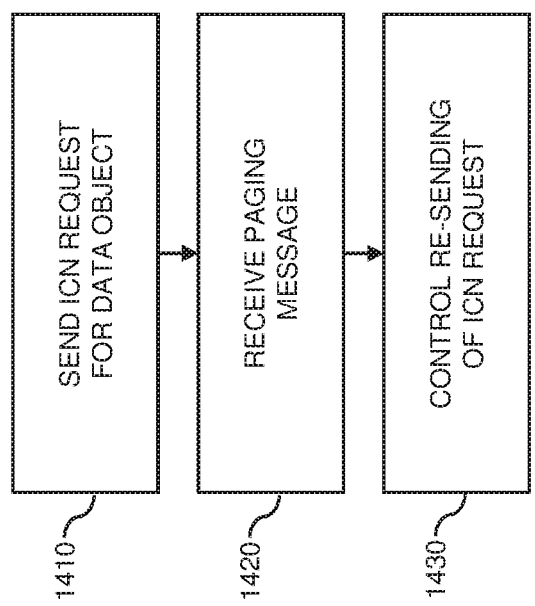
FIG. 14 shows a flowchart for schematically illustrating a method performed by a UE according to an embodiment of the invention.

FIG. 14 shows a flowchart for illustrating a method of conveying data in a cellular network. The method of FIG. 14 may be utilized for implementing the illustrated concepts in a UE, such as one of the UEs 210, 211, 510, 610. If a processor-based implementation of the UE is used, the steps of the method may be performed by one or more processors of the UE. In such a case the UE may further comprise a memory in which program code for implementing the below described functionalities is stored.

At step 1410, the UE sends sending an ICN request for a data object to an ICN node, such as one of the ICN nodes 201, 202, 203, 204, 205, 206, 207; 501, 502, 503, 504, 505; 670. In accordance with ICN principles, the ICN request identifies the data object by a name and is not addressed to a specific source of the data object. The ICN request may for example be an Interest message according to the CCNx specifications.

At step 1420, the UE receives a paging message from the cellular network. The UE may receive the paging message while being in idle mode, i.e., while it does not maintain a data connection to the cellular network. For example, after having sent the ICN request at step 1410, the UE may have changed idle mode. The paging message indicates that paging of the UE is due to the ICN request. The paging message may also indicate that the data object is available at the ICN node. Further, the paging message may include information on the available data object. Further, the paging message may include an indication for triggering re-sending of the ICN request by the UE.

At optional step 1430, the UE may control re-sending of the ICN request based on the paging message. In some cases, the UE may re-send the ICN request, e.g., in situations when the UE has moved to another ICN node. In other cases, the UE may not re-send the ICN request, e.g., in situations when the UE has re-connected to the same ICN node to which it sent the request at step 1410. Further, based on information included in the paging message, the UE may decide whether to leave an idle mode, in which the UE has no data connection to the cellular network. For example, the UE may decide whether to leave the ECM-IDLE state and to enter the ECM-CONNECTED state.

Figure 15:
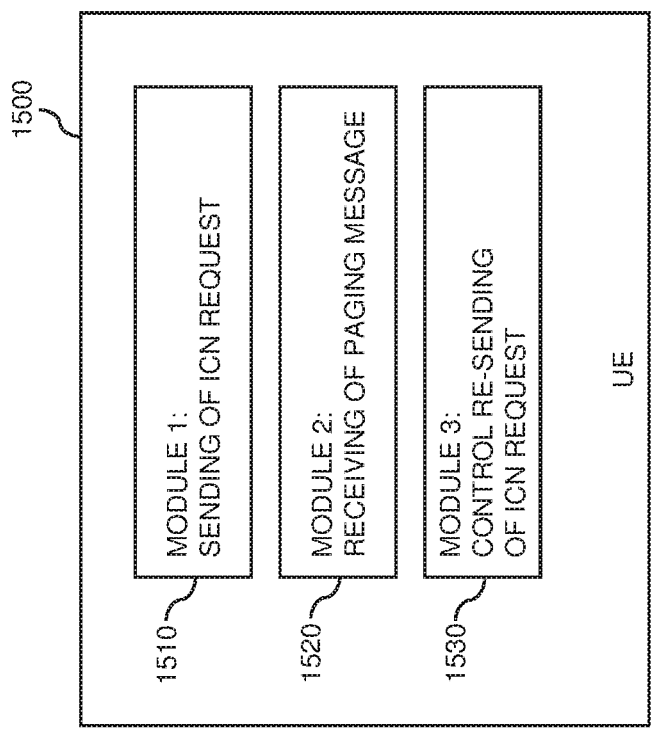
FIG. 15 shows a block diagram for illustrating functionalities of a UE according to an embodiment of the invention.

FIG. 15 shows a block diagram for illustrating functionalities of a UE 1500 which operates according to the method of FIG. 14. As illustrated, the UE 1500 may be provided with a module 1510 configured to send an ICN request to an ICN node, such as explained in connection with step 1410. Further, the UE 1500 may be provided with a module 1520 configured to receive a paging message, such as explained in connection with step 1420. Further, the UE 1500 may optionally be provided with a module 1530 configured to control re-sending of the ICN request, such as explained in connection with step 1430.

It is to be understood that the methods of FIGS. 10, 12, and 14 could also be combined. For example, the methods FIG. 10 and FIG. 12 could be combined in a system including one or more access nodes operating according to the method of FIG. 10 and one or more ICN nodes operating according to the method of FIG. 12.

Figure 16:
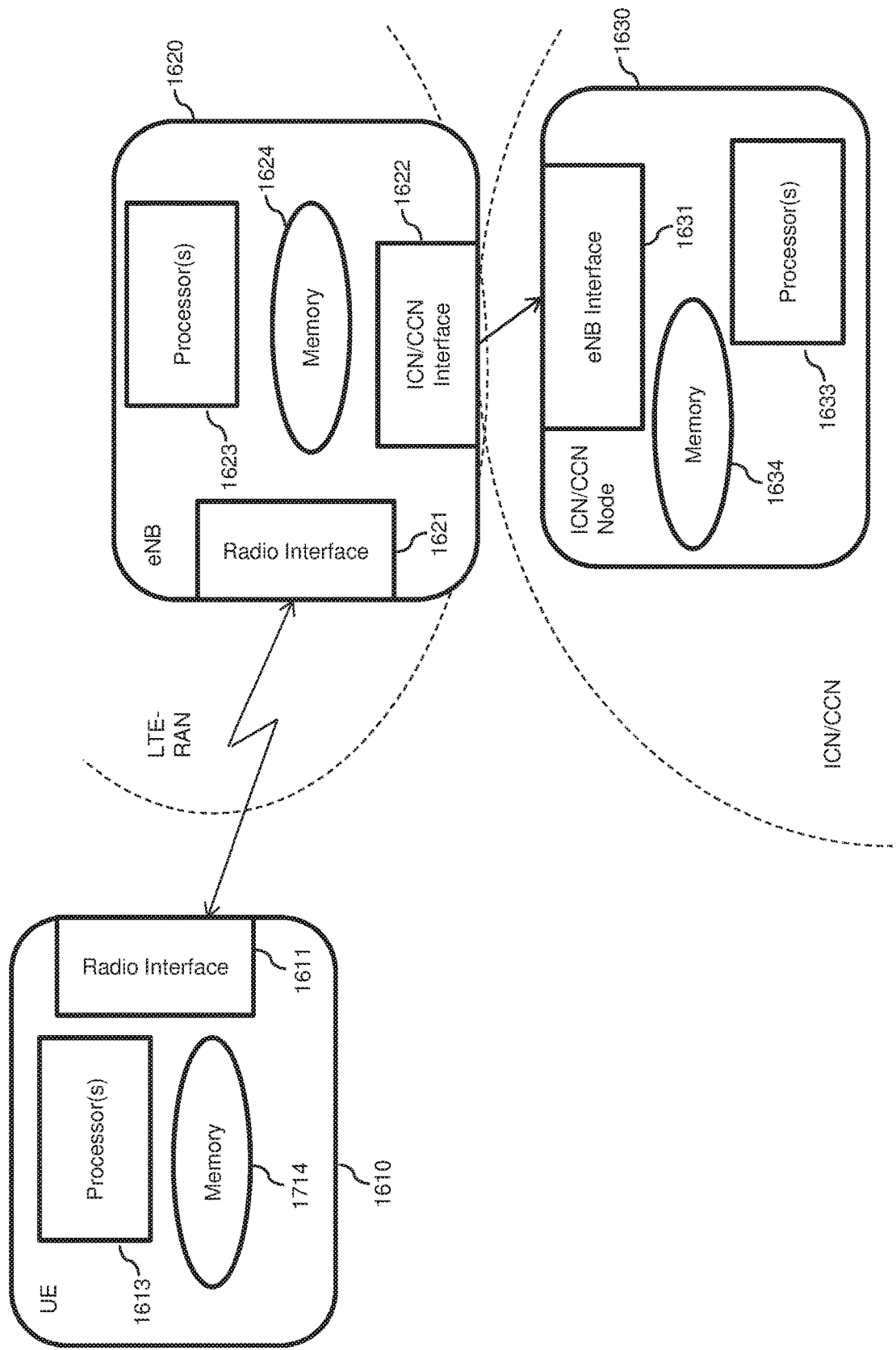
FIG. 16 schematically illustrates structures of devices according to embodiments of the invention.

FIG. 16 illustrates processor-based implementations of a UE 1610, an access node 1620, assumed as an eNB, and an ICN/CCN node 1630, which may be used in the concepts as explained above.

As illustrated, the UE 1610 includes a radio interface 1611 for connection to the eNB 1620, one or more processors 1613, and a memory 1614. The UE 1610 may correspond to a UE operating according to the method of FIG. 14, such as one of the above-mentioned UEs 210, 211, 510, 610. The interface 1611, the processor(s) 1613, and the memory 1614 may be coupled by one or more internal bus systems of the UE 1610. The memory 1614 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1614 may include suitably configured program code to be executed by the processor(s) 1613 so as to implement the above-described functionalities of a UE, such as explained in connection with FIG. 14.

As further illustrated, the eNB 1620 includes a radio interface 1621 for connection to the UE 1610, an ICN/CCN interface 1622 for connection to the ICN/CCN node 1630, one or more processors 1623, and a memory 1624. The eNB 1620 may correspond to an access node operating according to the method of FIG. 10, such as one of the above-mentioned access node 531, 532 or the eNB 620. The interfaces 1621, 1622 the processor(s) 1623, and the memory 1624 may be coupled by one or more internal bus systems of the eNB 1620. The memory 1624 may include a ROM, e.g., a flash ROM, a RAM, e.g., a DRAM or SRAM, a mass storage, e.g., a hard disk or solid state disk, or the like. The memory 1624 may include suitably configured program code to be executed by the processor(s) 1623 so as to implement the above-described functionalities of an access node, such as explained in connection with FIG. 10.

As further illustrated, the ICN/CCN node 1630 includes an eNB interface 1632 for connection to the eNB 1620, one or more processors 1633, and a memory 1634. Further, the ICN node 1630 may correspond to an ICN node operating according to the method of FIG. 12, such as one of the above-mentioned ICN nodes 201, 202, 203, 204, 205, 206, 207; 501, 502, 503, 504, 505; 670. The interface 1631, the processor(s) 1633, and the memory 1624 may be coupled by one or more internal bus systems of the ICN/CCN node 1630. The memory 1634 may include a ROM, e.g., a flash ROM, a RAM, e.g., a DRAM or SRAM, a mass storage, e.g., a hard disk or solid state disk, or the like. The memory 1634 may include suitably configured program code to be executed by the processor(s) 1633 so as to implement the above-described functionalities of an ICN node, such as explained in connection with FIG. 12.

It is to be understood that the structures as illustrated in FIG. 16 are merely schematic and that the UE 1610, the eNB 1620, or the ICN/CCN node may actually include further components which, for the sake of clarity, have not been illustrated, e.g., further interfaces or processors. Also, it is to be understood that in each case the memory may include further program code for implementing known functionalities of a UE, eNB, or ICN node, respectively. According to some embodiments, also a computer program may be provided for implementing functionalities of the UE 1610, the eNB 1620 or the ICN node 1630, e.g., in the form of a physical medium storing the program code and/or other data to be stored in the memory 1614, 1624, 1634 or by making the program code available for download or by streaming.

Accordingly, the present disclosure provides the following exemplary embodiments:

According to an embodiment, a method in a system is provided. The system comprises an LTE RAN and an ICN/CCN network connected to the LTE RAN. The LTE RAN has a coverage area in which UEs are present. The system stores correlations between an UE identifier and an entry in a PIT of the ICN/CCN, when that UE makes a content request to the ICN/CCN.

According to an embodiment the system uses the correlation to determine whether a UE, that has made a content request, can be put in idle mode or not.

According to an embodiment the system uses the correlation to page an UE that has made a content request and was put in idle mode.

According to a further embodiment, a method in an eNB for the LTE RAN is provided. The eNB has a connection to an ICN/CCN node of the ICN/CCN network, and has a coverage area in which UEs are present. The eNB maintains a correlation between an identifier of a UE making a content request to the ICN/CCN and an entry in a PIT of the ICN/CCN node for that request.

According to an embodiment the eNB uses the correlation to determine to leave a UE in connected mode when the UE identifier matches the UE identifier in the correlation.

According to an embodiment the eNB uses the correlation to initiate paging an UE that has made a content request and was put in idle mode.

According to a further embodiment, a method in an ICN/CCN node for an ICN/CCN network is provided. The ICN/CCN node has a connection to an eNB having a coverage area in which UEs are present. The ICN/CCN node receives a content request from a UE and an identity of that UE. The ICN/CCN node maintains a correlation between the UE identity and an entry in a PIT of the ICN/CCN node for that request.

According to a further embodiment, a method in an eNB for the LTE RAN is provided. The eNB has a connection to an ICN/CCN node of the ICN/CCN network, and has a coverage area in which UEs are present. The eNB forwards an identity of an UE making a content request with that content request to the ICN/CCN node. The eNB interrogates with the node if a pending request exists for an identity of a UE before putting a UE in idle mode. The eNB putts the UE in idle mode if such a pending request does not exist or leaves the UE in connected mode when such a pending request does exist.

According to a further embodiment, a system is provided. The system comprises an LTE RAN and an ICN/CCN network connected to the LTE RAN. The LTE RAN has a coverage area in which UEs are present. The system further comprises a memory which has a table holding correlations between identifiers of UEs making a content request to the ICN/CCN network and an entry of the request in a PIT of the ICN/CCN network.

According to a further embodiment, an eNB for the LTE RAN is provided. The eNB has a connection to an ICN/CCN node for the ICN/CCN network, and has a coverage area in which UEs are present, the eNB has a memory having said table for holding correlations. The eNB is adapted to perform the methods according to the present disclosure.

According to a further embodiment, an ICN/CCN node for the ICN/CCN network is provided. The ICN/CCN node has a connection to an eNB having a coverage area in which UEs are present. The ICN/CCN node has a memory having said table for holding correlations. The ICN/CCN node is adapted to perform the methods according to the present disclosure.

As can be seen, the concepts as described above may be used for efficiently conveying data in a cellular network. For example, the concepts may be used for enhancing the cellular network with ICN capabilities and efficiently taking into account mobility and state transitions of UEs.

It is to be understood that the examples and embodiments as explained above are merely illustrative and susceptible to various modifications. For example, the illustrated concepts may be applied in connection with various kinds of cellular network technologies, without limitation to the LTE technology. Further, the illustrated concepts may be applied in connection with various kinds of ICN enhanced network nodes, without limitation to routers, switches, gateways, or proxies. Further, the illustrated concepts may be applied in connection with various kinds of ICN technologies, without limitation to CCN or NDN. Further, it is noted that while paging of a UE would typically be done when the UE is in idle mode, it is also possible to page a UE while it is in active mode. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method performed by an access node of a cellular network, communicatively coupled to an Information Centric Network (ICN), the method comprising:
   receiving a content request from a User Equipment (UE) having a connection to the access node, the content request being directed to corresponding named content deliverable via the ICN;
   linking a UE identifier of the UE to the request, the UE identifier used at least temporarily within the cellular network to identify the UE for data delivery via the cellular network;
   forwarding the request to the ICN; and
   performing at least one of the following operations:
      while the UE remains connected to the access node and the request is pending, extending an inactivity period allowed for the UE before triggering disconnection of the UE; or
      after releasing the connection to the UE and while the request is pending, initiating paging of the UE in response to receiving signaling from the ICN indicating that the named content corresponding to the request is available.

2. The method of claim 1, wherein extending the inactivity period comprises permitting the UE to remain inactive for a longer period before releasing the connection, than is permitted for inactive UEs without pending requests to the ICN.

3. The method of claim 1, wherein linking the UE identifier to the request comprises at least one of:
   logging the UE identifier locally at the access node, in a listing of UEs having pending requests to the ICN; or
   sending the UE identifier towards the ICN, in conjunction with forwarding the request to the ICN, for logging by the ICN.

4. The method of claim 1, wherein initiating paging of the UE comprises initiating paging of the UE with an indication that the reason for the paging is the availability of the named content corresponding to the request.

5. The method of claim 4, wherein, in response to the UE responding to the paging by reconnecting to the access node, the method further includes the access node delivering the named content to the UE, as received by the access node from the ICN.

6. The method of claim 4, wherein initiating the paging of the UE comprises sending signaling to a mobility management entity in the cellular network that is configured for controlling the paging of the UE from one or more access nodes.

7. An access node configured for operation in a cellular network, the access node comprising:
   a first communication interface configured to communicatively couple the access node to an Information Centric Network (ICN);
   a second communication interface configured to communicatively couple the access node to User Equipments (UEs) wirelessly; and
   processing circuitry operatively associated with the first and second communication interfaces and configured to:
      receive a content request from a User Equipment (UE) having a cellular radio connection to the access node, the content request being directed to corresponding named content deliverable via the ICN;
      link a UE identifier of the UE to the request, the UE identifier used at least temporarily within the cellular network to identify the UE for data delivery via the cellular network;
      forward the request to the ICN; and
      perform at least one of the following operations:
         while the UE remains connected to the access node and the request is pending, extend an inactivity period allowed for the UE before triggering disconnection of the UE; or
         after releasing the cellular radio connection to the UE and while the request is pending, initiate paging of the UE in response to receiving signaling from the ICN indicating that the named content corresponding to the request is available.

8. The access node of claim 7, wherein the processing circuitry is configured to extend the inactivity period by permitting the UE to remain inactive for a longer period before releasing the cellular radio connection, than is permitted for inactive UEs without pending requests to the ICN.

9. The access node of claim 7, wherein the processing circuitry is configured to link the UE identifier to the request by at least one of:
   logging the UE identifier locally at the access node, in a listing of UEs having pending requests to the ICN; or
   sending the UE identifier towards the ICN, in conjunction with forwarding the request to the ICN, for logging by the ICN.

10. The access node of claim 7, wherein the processing circuitry is configured to initiate paging of the UE with an indication that the reason for the paging is the availability of the named content corresponding to the request.

11. The access node of claim 10, wherein, in response to the UE responding to the paging by reconnecting to the access node, the processing circuitry is configured to deliver the named content to the UE via the access node, as received by the access node from the ICN.

12. The access node of claim 10, wherein the processing circuitry is configured to initiate the paging of the UE by sending signaling to a mobility management entity in the cellular network that is configured for controlling the paging of the UE from one or more access nodes, wherein the signaling is sent via the first communication interface or a third communication interface of the access node that is configured to communicatively couple the access node to the mobility management entity.

13. A method by an Information Centric Network (ICN) node configured for operation in an ICN, the method comprising:
   receiving a request for named content deliverable from the ICN, the request forwarded to the ICN node from an access node of a cellular network and originating from a User Equipment (UE) connected to the access node and including a UE identifier, the UE identifier used at least temporarily within the cellular network to identify the UE for data delivery via the cellular network;
   storing the request as an entry in a Pending Interest Table (PIT), including storing the UE identifier in association with the request; and
   responsive to the named content becoming available, sending signaling to the access node that indicates the UE identifier and indicates the availability of the named content and, responsive to the access node indicating that the UE is no longer connected to the access node, sending further signaling to the cellular network to initiate paging of the UE by the cellular network for delivery of the named content, the further signaling indicating the UE identifier.

14. An Information Centric Network (ICN) node configured for operation in an ICN, the ICN node comprising:
a communication interface configured to communicatively couple the ICN node at least to an access node in a cellular network; and
processing circuitry operatively associated with the communication interface and configured to:
receive a request for named content deliverable from the ICN, the request forwarded to the ICN node from the access node and originating from a User Equipment (UE) connected to the access node and including a UE identifier, the UE identifier used at least temporarily within the cellular network to identify the UE for data delivery via the cellular network;
store the request as an entry in a Pending Interest Table (PIT), including storing the UE identifier in association with the request; and
responsive to the named content becoming available, send signaling to the access node that indicates the UE identifier and indicates the availability of the named content and, responsive to the access node indicating that the UE is no longer connected to the access node, send further signaling to the cellular network, via the communication interface or a further communication interface of the ICN node, to initiate paging of the UE by the cellular network for delivery of the named content, the further signaling indicating the UE identifier.

* * * * *

UNITED STATES PATENT AND TRADEMARK OFFICE
CERTIFICATE OF CORRECTION

PATENT NO. : 11,051,355 B2  
APPLICATION NO. : 15/108432  
DATED : June 29, 2021  
INVENTOR(S) : Mildh et al.

Page 1 of 1

It is certified that error appears in the above-identified patent and that said Letters Patent is hereby corrected as shown below:

In the Specification

In Column 5, Line 28, delete "content source to 220." and insert -- content source 220. --, therefor.

In Column 6, Line 15, delete "for" and insert -- of --, therefor.

In Column 6, Line 20, delete "as on" and insert -- as an --, therefor.

In Column 8, Line 26, delete "though" and insert -- through --, therefor.

In Column 11, Line 57, delete "according by" and insert -- according to --, therefor.

In Column 12, Line 54, delete "used a trigger" and insert -- used as a trigger --, therefor.

In Column 18, Line 20, delete "putts" and insert -- puts --, therefor.

In the Claims

In Column 19, Line 29, in Claim 2, delete "than" and insert -- then --, therefor.

In Column 20, Line 19, in Claim 8, delete "than" and insert -- then --, therefor.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*